(12) United States Patent
Balasubramanian et al.

(10) Patent No.: US 11,991,656 B2
(45) Date of Patent: May 21, 2024

(54) SYNCHRONIZATION SIGNAL SELECTION ACROSS MULTIPLE TRANSCEIVER NODES

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/157,585

(22) Filed: Jan. 25, 2021

(65) Prior Publication Data

US 2022/0240207 A1 Jul. 28, 2022

(51) Int. Cl.
*H04W 56/00* (2009.01)
*H04B 17/318* (2015.01)
*H04W 4/40* (2018.01)
*H04W 24/10* (2009.01)

(52) U.S. Cl.
CPC ...... *H04W 56/0015* (2013.01); *H04B 17/318* (2015.01); *H04W 4/40* (2018.02); *H04W 24/10* (2013.01); *H04W 56/0095* (2013.01)

(58) Field of Classification Search
None
See application file for complete search history.

(56) References Cited

U.S. PATENT DOCUMENTS

| 10,863,466 B2 | 12/2020 | Blasco Serrano |
| 2005/0276322 A1* | 12/2005 | Best ..................... H04B 1/7183 375/130 |
| 2007/0165142 A1* | 7/2007 | Lin ....................... H04N 21/426 725/100 |

(Continued)

FOREIGN PATENT DOCUMENTS

WO   WO-2021080372 A1 *  4/2021  ......... G01S 5/02216

OTHER PUBLICATIONS

International Search Report and Written Opinion—PCT/US2021/062020—ISA/EPO—dated Mar. 23, 2022 (2100092WO).

*Primary Examiner* — Ajit Patel
*Assistant Examiner* — Liem H. Nguyen
(74) *Attorney, Agent, or Firm* — Holland & Hart LLP

(57) ABSTRACT

Methods, systems, and devices for wireless communications are described. Generally, the described techniques provide for a user equipment (UE) to select a synchronization signal from multiple synchronization signals received at transceiver nodes of the UE based on configured selection rules. The UE may receive control signaling from another UE, a base station, or some other device indicating a rule for selecting between multiple synchronization signals received across transceiver nodes of the UE. The selection rule may indicate signal quality comparison metrics for selecting the synchronization signal, such as reference signal received power (RSRP) metrics, timing metrics, priority metrics, or a combination thereof. The UE may select a synchronization signal for deriving a timing at the UE based on the selection rule. The UE may forward the selected synchronization signal to one or more other UEs by transmitting the selected synchronization signal via each transceiver node at the UE.

30 Claims, 12 Drawing Sheets

(56) References Cited

U.S. PATENT DOCUMENTS

| | | | | |
|---|---|---|---|---|
| 2010/0322117 | A1* | 12/2010 | Gurski | H03G 3/3052 |
| | | | | 370/280 |
| 2013/0016692 | A1* | 1/2013 | Chen | H04L 5/0094 |
| | | | | 370/330 |
| 2015/0327201 | A1* | 11/2015 | He | H04W 56/0025 |
| | | | | 370/336 |
| 2017/0006563 | A1* | 1/2017 | Lindoff | H04W 24/08 |
| 2017/0142703 | A1* | 5/2017 | Xue | H04W 76/14 |
| 2017/0331620 | A1* | 11/2017 | Tsai | H04L 7/042 |
| 2018/0139710 | A1* | 5/2018 | Li | H04W 56/00 |
| 2019/0056506 | A1* | 2/2019 | Bialer | G01S 7/4004 |
| 2019/0082411 | A1* | 3/2019 | Feng | H04W 56/0025 |
| 2019/0089579 | A1* | 3/2019 | Sang | H04W 36/00837 |
| 2019/0098589 | A1 | 3/2019 | Chae et al. | |
| 2019/0132778 | A1* | 5/2019 | Park | H04B 7/0695 |
| 2019/0159150 | A1 | 5/2019 | Nguyen et al. | |
| 2019/0357166 | A1* | 11/2019 | Blasco Serrano | |
| | | | | H04W 56/0015 |
| 2020/0112087 | A1* | 4/2020 | Kulkarni | H04B 7/0639 |
| 2020/0322910 | A1* | 10/2020 | Zhang | H04W 4/70 |
| 2021/0051617 | A1* | 2/2021 | Gulati | H04W 56/0005 |
| 2021/0176723 | A1* | 6/2021 | Khoryaev | H04W 72/005 |
| 2021/0368465 | A1* | 11/2021 | Chen | H04W 76/11 |
| 2022/0015047 | A1* | 1/2022 | Ryu | H04W 56/0015 |

\* cited by examiner

SYNCHRONIZATION SIGNAL SELECTION ACROSS MULTIPLE TRANSCEIVER NODES

FIELD OF TECHNOLOGY

The following relates to wireless communications, including synchronization signal selection across multiple transceiver nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices such as UEs may include multiple transmission and reception points (TRPs). A UE may receive one or more synchronization signals with received power and signal quality values at each respective TRP of the UE. The received power and quality of the synchronization signals may be different at each TRP of the UE, which may result in ambiguity in terms of which synchronization signal to select for deriving a timing at the UE.

SUMMARY

The described techniques relate to improved methods, systems, devices, and apparatuses that support synchronization signal selection across multiple transceiver nodes. Generally, the described techniques provide for a user equipment (UE) to be configured with one or more rules (e.g., selection metrics) for selecting a synchronization signal from multiple synchronization signals received at one or more transmission and reception points (TRPs) (e.g., transceiver nodes) of the UE. The UE may receive control signaling from another sidelink UE, a base station, or some other device indicating a rule for selecting between synchronization signals received at the UE. In some examples, the control signaling may include one or more selection thresholds for the UE to use for selecting the synchronization signal. Additionally or alternatively, the UE the rule, the selection thresholds, or both, may be configured at the UE. The rule may indicate signal quality comparison metrics for selecting the synchronization signal. The UE may receive multiple synchronization signals across one or more TRPs of the UE, and the UE may select a synchronization signal from the multiple synchronization signals for deriving a timing at the UE based on the signal quality comparison metrics indicated in the selection rule. For example, the UE may select the synchronization signal based on comparative reference signal received power (RSRP) measurements of the synchronization signals across TRPs, comparative timing conveyed by the synchronization signals, priorities of the TRPs of the UE, or a combination thereof. The UE may derive the timing from the selected synchronization signal to use for communications, and the UE may forward the selected synchronization signal to one or more other devices. The UE may forward the selected timing information by transmitting (e.g., broadcasting) the selected synchronization signal using each TRP at the UE.

A method for wireless communications at a UE is described. The method may include receiving control signaling indicating a rule for selecting between a first synchronization signal received at a first transceiver node of the UE and a second synchronization signal received at a second transceiver node of the UE, selecting, from the first synchronization signal and the second synchronization signal based on the rule, a synchronization signal for deriving a timing at the UE, and forwarding the selected synchronization signal to one or more other UEs based on the selecting.

An apparatus for wireless communications at a UE is described. The apparatus may include a processor, memory in electronic communication with the processor, and instructions stored in the memory. The instructions may be executable by the processor to cause the apparatus to receive control signaling indicating a rule for selecting between a first synchronization signal received at a first transceiver node of the UE and a second synchronization signal received at a second transceiver node of the UE, select, from the first synchronization signal and the second synchronization signal based on the rule, a synchronization signal for deriving a timing at the UE, and forward the selected synchronization signal to one or more other UEs based on the selecting.

Another apparatus for wireless communications at a UE is described. The apparatus may include means for receiving control signaling indicating a rule for selecting between a first synchronization signal received at a first transceiver node of the UE and a second synchronization signal received at a second transceiver node of the UE, means for selecting, from the first synchronization signal and the second synchronization signal based on the rule, a synchronization signal for deriving a timing at the UE, and means for forwarding the selected synchronization signal to one or more other UEs based on the selecting.

A non-transitory computer-readable medium storing code for wireless communications at a UE is described. The code may include instructions executable by a processor to receive control signaling indicating a rule for selecting between a first synchronization signal received at a first transceiver node of the UE and a second synchronization signal received at a second transceiver node of the UE, select, from the first synchronization signal and the second synchronization signal based on the rule, a synchronization signal for deriving a timing at the UE, and forward the selected synchronization signal to one or more other UEs based on the selecting.

In some examples of the method, apparatuses, and non-transitory computer-readable medium described herein, the rule indicates signal quality comparison metrics for selecting the synchronization signal from the first synchronization signal and the second synchronization signal.

Some examples of the method, apparatuses, and non-transitory computer-readable medium described herein may further include operations, features, means, or instructions for measuring a first RSRP value associated with the first synchronization signal and a second RSRP value associated with the second synchronization signal, determining that the first RSRP value may be greater than the second RSRP value at the first transceiver node and the second RSRP value may be greater than the first RSRP value at the second transceiver node, the first RSRP value and the second RSRP value may be both greater than an RSRP threshold, and a difference between a maximum timing and a minimum timing of the first synchronization signal and the second synchronization signal may be less than a timing threshold, and selecting the synchronization signal randomly from the first synchronization signal or the second synchronization signal based on the determining.

Some examples of the method, apparatuses, and non-transitory computer-readable medium described herein may further include operations, features, means, or instructions for receiving control signaling indicating the RSRP threshold and the timing threshold.

In some examples of the method, apparatuses, and non-transitory computer-readable medium described herein, the RSRP threshold, the timing threshold, or both, may be based on a quantity of synchronization signals received at the UE, a quantity of transceiver nodes at the UE, or both.

Some examples of the method, apparatuses, and non-transitory computer-readable medium described herein may further include operations, features, means, or instructions for measuring a first RSRP value associated with the first synchronization signal and a second RSRP value associated with the second synchronization signal, identifying a first priority of the first transceiver node and a second priority of the second transceiver node, determining that the first RSRP value may be greater than the second RSRP value at the first transceiver node and the second RSRP value may be greater than the first RSRP value at the second transceiver node, the first RSRP value and the second RSRP value may be greater than an RSRP threshold, and the first priority may be greater than the second priority, and selecting the first synchronization signal based on the determining.

Some examples of the method, apparatuses, and non-transitory computer-readable medium described herein may further include operations, features, means, or instructions for receiving control signaling indicating the RSRP threshold.

In some examples of the method, apparatuses, and non-transitory computer-readable medium described herein, the RSRP threshold may be determined based on a quantity of transceiver nodes at the UE, a quantity of synchronization signals received at the UE, or both.

Some examples of the method, apparatuses, and non-transitory computer-readable medium described herein may further include operations, features, means, or instructions for receiving signaling from one or more source UEs, where the signaling indicates a set of location parameters associated with the one or more source UEs, determining a duration that the one or more source UEs will be within a threshold distance of the UE based on the set of location parameters, and determining a first priority of the first transceiver node and a second priority of the second transceiver node based on the duration.

In some examples of the method, apparatuses, and non-transitory computer-readable medium described herein, the set of location parameters includes a relative location, a relative motion, a destination, or a combination thereof for each source UE of the one or more source UEs.

In some examples of the method, apparatuses, and non-transitory computer-readable medium described herein, determining the first priority and the second priority may include operations, features, means, or instructions for comparing the set of location parameters with location information associated with the UE, determining that the one or more source UEs will be within a first threshold distance of the first transceiver node for a first time period and that the one or more source UEs will be within a second threshold distance of the second transceiver node for a second time period, and determining the first priority and the second priority based on the first time period, the second time period, and a priority scale.

Some examples of the method, apparatuses, and non-transitory computer-readable medium described herein may further include operations, features, means, or instructions for receiving the signaling at an application layer of the UE, determining the first time period and the second time period at the application layer of the UE, determining the first priority and the second priority at a vehicle-to-everything (V2X) layer of the UE based on the first time period, the second time period, and the priority scale, and selecting the synchronization signal at a physical layer of the UE based on the first priority and the second priority.

In some examples of the method, apparatuses, and non-transitory computer-readable medium described herein, the selecting may include operations, features, means, or instructions for determining a highest RSRP value of a first RSRP value associated with the first synchronization signal at the first transceiver node and the second transceiver node and a second RSRP value associated with the second synchronization signal at the first transceiver node and the second transceiver node and selecting the synchronization signal based on the synchronization signal having the highest RSRP value.

In some examples of the method, apparatuses, and non-transitory computer-readable medium described herein, the selecting may include operations, features, means, or instructions for determining a first combined RSRP value for the first synchronization signal at the first transceiver node and the second transceiver node and a second combined RSRP value for the second synchronization signal at the first transceiver node and the second transceiver node and selecting the synchronization signal based on the synchronization signal having a highest combined RSRP value of the first combined RSRP value and the second combined RSRP value.

In some examples of the method, apparatuses, and non-transitory computer-readable medium described herein, the selecting may include operations, features, means, or instructions for determining a highest minimum RSRP value from a first minimum RSRP value associated with the first synchronization signal and a second minimum RSRP value associated with the second synchronization signal and selecting the synchronization signal based on the synchronization signal having the highest minimum RSRP value.

In some examples of the method, apparatuses, and non-transitory computer-readable medium described herein, the selecting may include operations, features, means, or instructions for determining a minimum RSRP variation between a first RSRP variation and a second RSRP variation, where the first RSRP variation may be based on a difference between a first RSRP value associated with the first synchronization signal at the first transceiver node and a second RSRP value associated with the first synchronization signal at the second transceiver node and the second RSRP variation may be based on a difference between a third RSRP value associated with the second synchronization signal at the first transceiver node and a fourth RSRP value associated with the second synchronization signal at the second transceiver node and selecting the synchronization signal based on the synchronization signal having the minimum RSRP variation.

In some examples of the method, apparatuses, and non-transitory computer-readable medium described herein, the forwarding may include operations, features, means, or instructions for transmitting the selected synchronization signal to the one or more other UEs using the first transceiver node and the second transceiver node.

In some examples of the method, apparatuses, and non-transitory computer-readable medium described herein, the first transceiver node and the second transceiver node may include one or more transmitter and receiver components.

In some examples of the method, apparatuses, and non-transitory computer-readable medium described herein, the UE may be a vehicle UE.

DETAILED DESCRIPTION

Figure 1:
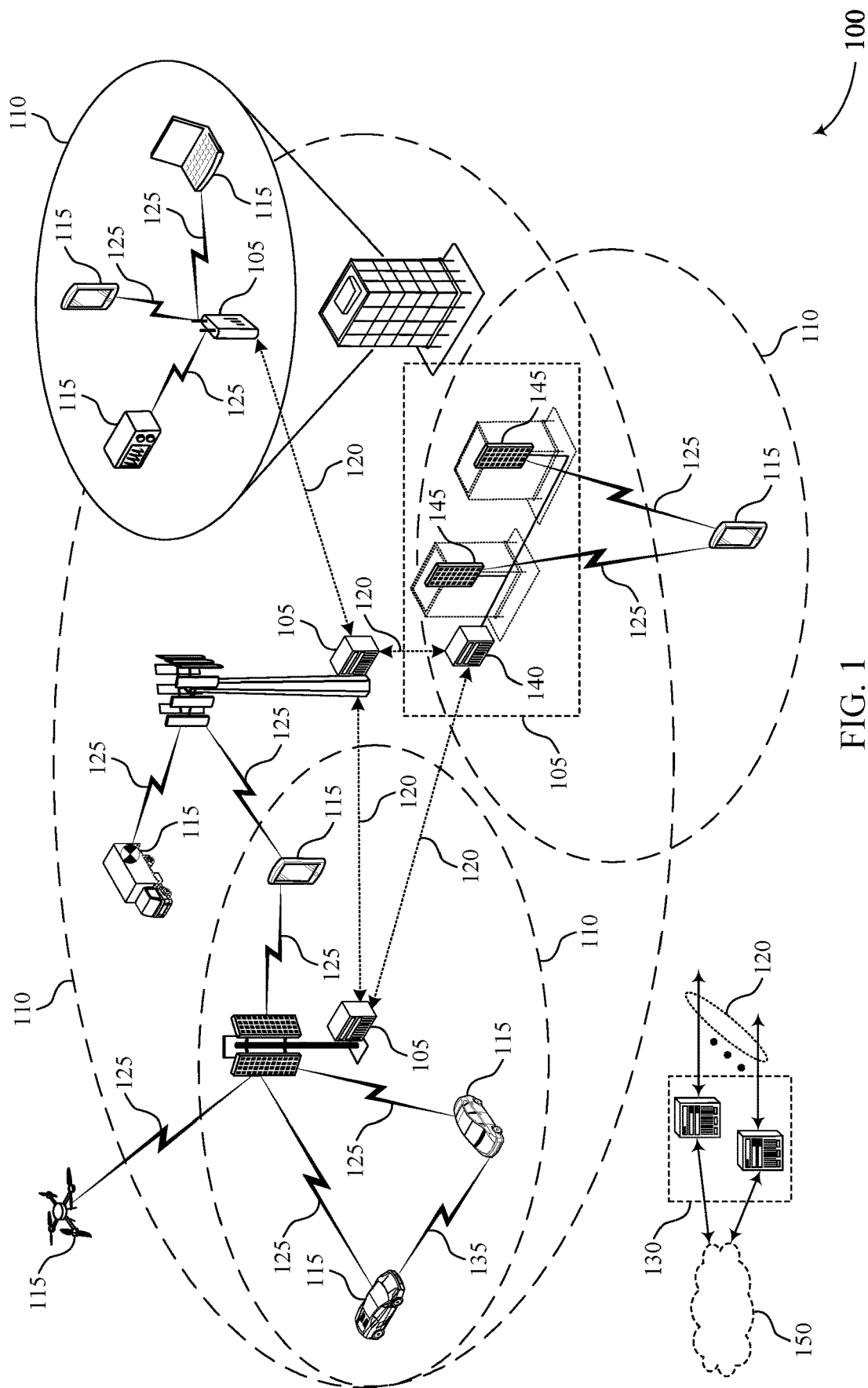
FIG. 1 illustrates an example of a wireless communications system that supports synchronization signal selection across multiple transceiver nodes in accordance with aspects of the present disclosure.

In some wireless communications systems, a user equipment (UE) may detect one or more synchronization signals from other devices, and the UE may select a synchronization signal for deriving a timing at the UE. In some cases, the UE may choose a synchronization signal that is received with the highest reference signal received power (RSRP) to decode and use for synchronization and timing for communications. If the UE includes multiple antenna modules, the UE may select the synchronization signal based on a maximum RSRP over all the antenna modules. In some examples, the UE may include multiple transceiver nodes (e.g., transmission and reception points (TRPs)) that each include one or more antenna modules. The UE may receive synchronization signals with different comparative RSRP values at each TRP. For example, a multi-TRP (mTRP) UE may receive two synchronization signals at two different TRPs on the UE. The first synchronization signal may be received at a first TRP with a higher RSRP than the second synchronization signal, but the first synchronization signal may be received at a second TRP of the UE with a lower RSRP than the second synchronization signal. The differences in RSRP values at each TRP may result in ambiguity in terms of which synchronization signal to select.

As described herein, to improve the selection of synchronization signals at mTRP UEs, a UE may be configured with one or more selection rules for selecting a synchronization signal from a set of synchronization signals received across the multiple TRPs of the UE. The selection rules may indicate signal quality comparison metrics for the UE to use for selecting the synchronization signal. The selection rules may be based on measured RSRP values of the synchronization signals, timing conveyed by the synchronization signals, a priority of each TRP of the UE, or a combination thereof. The UE may utilize the selection rules to reduce ambiguity and select a pertinent synchronization signal for deriving timing at the UE.

In some examples, the UE may identify a synchronization signal that is received with an RSRP value that is greater than the RSRP values of all the synchronization signals received at a first TRP of the UE and a second synchronization signal that is received with a RSRP value that is greater than the RSRP values of all the synchronization signals received at a second TRP of the UE. The UE may determine that an RSRP value of each synchronization signal received at the UE is greater than a threshold (e.g., a configured RSRP threshold). In such cases, if the set of synchronization signals include timing information that is within a configured range (e.g., a difference between a maximum timing value and a minimum timing value of the synchronization signals is less than a timing threshold), the selection rules may instruct the UE to select a synchronization signal randomly from the set of synchronization signals received at the UE. Additionally or alternatively, the UE may determine priorities for each TRP of the UE, and the selection rules may instruct the UE to select the synchronization signal that is received with the highest RSRP value at a TRP with a highest priority of the TRPs of the UE. In other examples, the selection rules may instruct the UE to select a synchronization signal based on the synchronization signal having the highest RSRP value, the highest combined RSRP value, the highest minimum RSRP value, or the least RSRP variation across the TRPs of the UE.

The priority of each TRP of the UE may be determined by an application layer of the UE, a vehicle-to-everything (V2X) layer of the UE, or both (e.g., at a Layer 2 of the UE). The priority may be determined based on a time that one or more synchronization signal source UEs (e.g., source UEs that transmit the synchronization signals) will be in the vicinity of the UE and a relative location and motion of the source UEs with respect to each TRP of the UE. The UE may determine priorities of the TRPs based on which TRPs are close to reliable synchronization signal sources to improve the selection of a reliable and accurate synchronization signal.

Aspects of the disclosure are initially described in the context of wireless communications systems. Additional aspects of the disclosure are described with reference to protocol layer stack configurations and process flows. Aspects of the disclosure are further illustrated by and described with reference to apparatus diagrams, system diagrams, and flowcharts that relate to synchronization signal selection across multiple transceiver nodes.

FIG. 1 illustrates an example of a wireless communications system 100 that supports synchronization signal selection across multiple transceiver nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

A UE 115 may use multiple antenna panels (e.g., TRPs) for transmission or reception, and each antenna panel may have a corresponding antenna panel ID, which may be unique to the antenna panel. Antenna panels, as shown and described herein, are for illustrative purposes as any antenna component, antenna element, antenna port, TRP, device, etc. may be considered without departing from the scope of the present disclosure. The antenna panels may be associated with a set of downlink or uplink signals and channels, and the antenna panel IDs may be associated with the set of signal or channel IDs (e.g., the antenna panel IDs may be indicated by or derived from the signal or channel IDs).

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 (e.g., a sidelink UE 115) may include one or more transceiver nodes (e.g., TRPs) and may detect multiple synchronization signals from other UEs 115 (e.g., or some other devices) at the one or more TRPs of the UE 115. The UE 115 may receive the synchronization signals with different signal quality metrics at each TRP. The UE 115 may be configured with one or more selection rules, selection thresholds, or both, for selecting a synchronization signal from the multiple synchronization signals received by the UE 115. In some examples, the UE 115 may receive control signaling from a base station 105, another UE 115, or some other device indicating the selection rules. Additionally or alternatively, the UE 115 may be configured with the selection rules. The selection rules may indicate signal quality comparison metrics for the UE 115 to use for selecting a synchronization signal. The UE 115 may select a synchronization signal for deriving timing at the UE 115 based on the selection rules. The UE 115 may derive the timing to use for communications in the wireless communications system 100. The UE 115 may forward the selected synchronization signal conveying the timing to one or more other devices by transmitting the synchronization signal via each TRP of the UE 115. The UE 115 may thereby utilize the selection rules to reduce ambiguity and select a pertinent synchronization signal for deriving timing at the UE 115.

Figure 2:
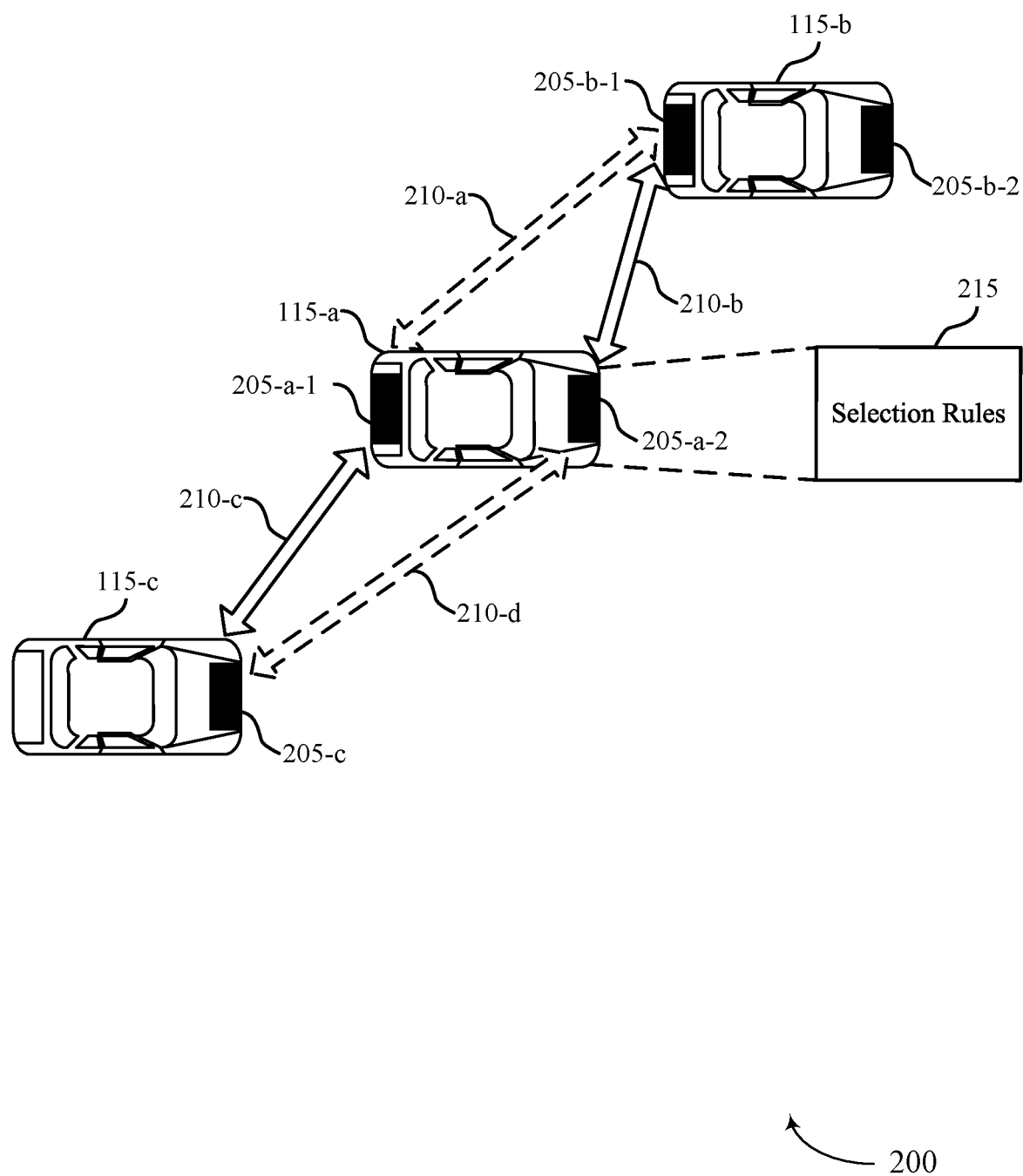
FIG. 2 illustrates an example of a wireless communications system that supports synchronization signal selection across multiple transceiver nodes in accordance with aspects of the present disclosure.

FIG. 2 illustrates an example of a wireless communications system 200 that supports synchronization signal selection across multiple transceiver nodes in accordance with aspects of the present disclosure. In some examples, the wireless communications system 200 may implement aspects of the wireless communications system 100. The wireless communications system 200 may include UE 115-a, UE 115-b, and UE 115-c, which may be examples of UEs 115 as described with reference to FIG. 1. In some examples, UEs 115-a, 115-b, and 115-c may be vehicle UEs (VUEs) 115. UE 115-a may communicate with UE 115-b via sidelink communication links 210-a and 210-b and with UE 115-c via sidelink communication links 210-c and 210-d. UEs 115-a, 115-b, and 115-c may include one or more TRPs 205-a, 205-b, and 205-c, respectively. UE 115-a may be configured with one or more selection rules 215 for selecting a synchronization signal from multiple synchronization signals received across the TRPs 205-a of UE 115-a.

The wireless communications system 200 may include the one or more UEs 115 in a geographic coverage area (not shown). In some cases, the wireless communications system 200 may utilize control signaling to schedule resources for the UEs 115 to perform sidelink communications. For example, a base station 105 may transmit signals (e.g., gNB signals, eNB signals, global navigation satellite system (GNSS) signals, global positioning system (GPS) signals, other synchronization signals, or some other control signaling) to the one or more UEs 115 for synchronization and timing within the wireless communications system 200 (e.g., Mode 1 sidelink communications). Additionally or alternatively, the UEs 115 in the wireless communications system 200 may utilize shared information to enhance scheduling, inter-UE coordination, and communications flexibility (e.g., Mode 2 sidelink communications). The UEs 115 may transmit synchronization signals (e.g., sidelink synchronization signal blocks (S-SSBs) or other synchronization signals) to one another to save power, reduce latency, and ensure reliable communications. The synchronization signals may include timing for the UEs 115.

A UE 115 may monitor for synchronization signals from one or more synchronization sources (e.g., source UEs 115, base stations 105, or some other device). If the UE 115 is unable to detect synchronization signals (e.g., GNSS signals, eNB signals, gNB signals, S-SSB signals, or the like), the UE 115 may become a synchronization source (e.g., an independent synchronization source), and the UE 115 may transmit one or more synchronization signals to other devices.

In some cases, a UE 115 (e.g., a UE 115 having a single TRP 205, such as UE 115-c) may receive multiple synchronization signals from other devices, and the UE 115 may select a synchronization signal to use for synchronization and timing based on received RSRP values associated with the synchronization signals. For example, the UE 115 may choose a synchronization signal that is received at the UE 115 with the highest RSRP to use for deriving timing at the UE 115. If the UE 115 includes multiple antenna modules, the UE 115 may select the synchronization signal that is received with a maximum RSRP over all the antenna modules. However, in some examples, a UE 115 may include multiple TRPs 205 (e.g., a mTRP UE), and each TRP 205 may include one or more antenna modules.

UEs 115-a and 115-b illustrated in FIG. 2 may be multi-TRP UEs 115-a and 115-b. UE 115-a may include a first TRP 205-a-1 and a second TRP 205-a-2, and UE 115-b may include a first TRP 205-b-1 and a second TRP 205-b-2. In some examples, each of the TRPs 205 may be configured to receive and transmit signals. For example, TRPs 205-a-1 and 205-a-2 may be configured to transmit signals in conjunction with one another, individually (e.g., separately from one another), or both. In this regard, the TRPs 205 may include, but are not limited to, antennas, antenna panels, and the like. The base band processing for a mTRP UE 115 may be performed in a centralized unit of the UE 115, and the radio frequency (RF) processing may be performed near to respective TRPs 205. A mTRP system (e.g., a mTRP UE 115, or some other device) may install TRPs 205 based on a need. For example, the TRPs 205 may be installed to provide radio coverage or adapt existing radio coverage for the system or device.

In some cases, a device supporting sidelink communications (e.g., a car, such as VUEs 115-a, 115-b, and 115-c) may include a front antenna panel and a rear antenna panel (e.g., TRP 205-a-2 and TRP 205-a-1). Subsequently, larger vehicles (such as trucks and trailers) may include two or more TRPs 205. Some UEs 115, such as UE 115-c, may include a single TRP 205 (e.g., TRP 205-c). In some examples, the TRPs 205-a of UE 115-a may be positioned proximate (e.g., close) to one another. In other examples, the TRPs 205-a of UE 115-a may be physically separated from each other by some distance. In the example of the wireless communications system 200, TRP 205-a-2 may be positioned near the front of the vehicle, and TRP 205-a-1 may be positioned near the rear of the vehicle. In this example, TRP 205-a-1 (e.g., a first antenna panel) and TRP 205-a-2 (e.g., a second antenna panel) may be separated from one another by several meters (e.g., the length of the vehicle). The TRPs 205-b of UE 115-b may be positioned similarly. This physical separation may be even larger in the case of larger UEs 115, such as semi-trucks, where multiple TRPs 205 may be physically separated from one another by twenty meters or more.

Due to the separate components, physical position, and physical separation between the TRPs 205-a and 205-b of UEs 115-a and 115-b, each of the respective TRPs 205 may view a channel differently. TRP 205-a-1 may receive signals from UE 115-b via sidelink communications link 210-a, and TRP 205-a-2 may receive signals from UE 115-b via sidelink communications link 210-b. In this example, the signals received at TRP 205-a-1 may travel a greater distance than the signals received at TRP 205-a-2 (e.g., because UE 115-b may be closer to TRP 205-a-2 than TRP 205-a-1). The varying propagation distances may result in varying parameters (e.g., characteristics) associated with the signals received by the respective TRPs 205. For instance, due to the differences in propagation distances, the signals received at TRP 205-a-1 from UE 115-b may exhibit a lower signal quality (e.g., lower RSRP, lower reference signal received quality (RSRQ), higher SNR, higher signal to interference plus noise ratio (SINR), or the like) as compared to the signals received at TRP 205-a-2 from UE 115-b. Moreover, the signals received at TRP 205-a-1 may be received later in time than the signals received at TRP 205-a-2. These differences in signal parameters may result even if the respective signals are transmitted by UE 115-b at the same time and with the same transmit power.

UEs 115-b and 115-c may transmit synchronization signals to UE 115-a, and UE 115-a may receive and decode the synchronization signals to obtain timing information. UE 115-a may select a synchronization signal from multiple synchronization signals received at UE 115-a to use for deriving a timing for UE 115-a. UE 115-a may select the synchronization signal based on comparative signal quality metrics, channel parameters, characteristics of the transmitting devices, or the like, to obtain accurate synchronization and timing information. If the synchronization signals are received across the TRPs 205-a of UE 115-a with different comparative strengths and signal parameters at each TRP 205-a, UE 115-a may experience ambiguity in terms of which synchronization signal to select.

For example, a first synchronization signal, $S_1$, may be transmitted by UE 115-*b* via sidelink communication links 210-*a* and 210-*b*, and a second synchronization signal, $S_2$, may be transmitted by UE 115-*c* via sidelink communication links 210-*c* and 210-*d*. UE 115-*a* may receive $S_1$ at TRP 205-*a*-1 with a first RSRP and at TRP 205-*a*-2 with a second RSRP that is greater than the first RSRP (e.g., UE 115-*b* may be closer to TRP 205-*a*-2 than TRP-a-1, which may result in the higher RSRP value for $S_1$ at TRP 205-*a*-2). UE 115-*a* may receive $S_2$ at TRP 205-*a*-1 with a first RSRP and at TRP 205-*a*-2 with a second RSRP that is less than the first RSRP value (e.g., UE 115-*c* may be closer to TRP 205-*a*-1). UE 115-*a* may be unable to select the synchronization signal having the highest overall RSRP value, because the highest RSRP value at each TRP 205-*a* of UE 115-*a* is different.

As described herein, UE 115-*a* may be configured with selection rules 215 for selecting a synchronization signal from multiple synchronization signals received across the multiple TRPs 205-*a* of UE 115-*a*. UE 115-*a* may receive a number of synchronization signals (e.g., synchronization signals $\{S_1, S_2, \ldots, S_j\}$, where j is the number of received synchronization signals), and the selection rules 215 may provide instructions for UE 115-*a* to select a single synchronization signal for deriving timing at UE 115-*a*. The selection rules 215 may be associated with signal quality comparison metrics for UE 115-*a* to use for selecting the synchronization signal, such as RSRP metrics, timing metrics, TRP priority metrics, or the like. In some examples, the selection rules 215 may be based on one or more selection thresholds, such as RSRP thresholds, timing thresholds, or both. The selection thresholds may be determined (e.g., configured) based on a quantity of synchronization signals received at UE 115-*a*, a quantity of TRPs 205-*a* at UE 115-*a*, or both. For example, UE 115-*a* may receive a configuration indicating different selection thresholds to use for different numbers of synchronization signals received at UE 115-*a*, different numbers of TRPs 205-*a* at UE 115-*a*, or the like.

UE 115-*a* may receive control signaling indicating the selection rules 215, the one or more selection thresholds, or both. For example, a base station 105, another UE 115, such as UE 115-*b* or UE 115-*c*, a roadside unit, or some other device may transmit the indication of the selection rules 215 to UE 115-*a*. In some examples, the selection rules 215 may be examples of logical programming at UE 115-*a*, and UE 115-*a* may determine which synchronization signal to select based on logical statements and operations that make up the selection rules 215.

In one example, the selection rules 215 may instruct UE 115-*a* to determine whether a synchronization signal having the highest RSRP value of each synchronization signal received at one TRP 205-*a* of UE 115-*a* (e.g., a maximum RSRP value) is different from one or more other synchronization signals each having maximum RSRP values at one or more other TRPs 205-*a* of UE 115-*a*. For example, a maximum RSRP value at TRP 205-*a*-1 may be associated with a first synchronization signal and a maximum RSRP value at TRP 205-*a*-2 may be associated with a second synchronization signal. If the synchronization signal having the highest RSRP value at each TRP 205-*a* is different, the selection rules 215 may instruct UE 115-*a* to determine whether each of the synchronization signals (e.g., $\{S_1, S_2, \ldots, S_j\}$) are received at UE 115-*a* with an RSRP value that is greater than an RSRP threshold (e.g., a configured selection threshold).

In one example, of the selection rules 215, if the RSRP value of each synchronization signal is greater than the RSRP threshold, the selection rules 215 may instruct UE 115-*a* to obtain timing information from each of the one or more synchronization signals and compare a maximum timing of the synchronization signals with a minimum timing of the synchronization signals to obtain a timing difference. If the timing difference is less than a timing threshold (e.g., a configured selection threshold), the selection rules 215 may instruct UE 115-*a* to select a synchronization signal randomly from the one or more synchronization signals. By comparing the timing difference with the timing threshold, UE 115-*a* may determine whether the synchronization signals (and the source UEs 115 that transmit the synchronization signals) convey similar timing information (e.g., whether the timing variance between synchronization signals is relatively low or high). The selection rules 215 may instruct UE 115-*a* to select the synchronization signal randomly if each of the aforementioned conditions are met because the conditions may indicate that the synchronization signals are associated with sufficient RSRP values (e.g., greater than the RSRP threshold) and convey similar timing information (e.g., any of the synchronization signals may provide a relatively similar timing for UE 115-*a*). UE 115-*a* may forward the selected synchronization signal to one or more other UEs 115 by transmitting (e.g., broadcasting) the selected synchronization signal via TRP 205-*a*-1 and TRP 205-*a*-2 (e.g., via each TRP 205-*a* of UE 115-*a*).

In another example, the selection rules 215 may instruct UE 115-*a* to determine whether the maximum RSRP value at each TRP is different, and whether the RSRP of each of the synchronization signals received at UE 115-*a* are greater than the RSRP threshold. If the RSRP conditions are met, the selection rules 215 may instruct UE 115-*a* to determine a priority associated with each TRP 205-*a* and select a synchronization signal based on receiving the synchronization signal at a TRP 205-*a* having the highest priority. For example, if a synchronization signal having a maximum RSRP value at TRP 205-*a*-1 of UE 115-*a* is different from a synchronization signal having a maximum RSRP value at TRP 205-*a*-2 of UE 115-*a*, and if the RSRP values of all of the synchronization signals received at UE 115-*a* are greater than the RSRP threshold, UE 115-*a* may select a synchronization signal based on the priority information for the TRPs 205-*a* at UE 115-*a*. If TRP 205-*a*-1 has a higher priority than TRP 205-*a*-2, the selection rules 215 may instruct UE 115-*a* to select a synchronization signal that is received with the highest RSRP value at TRP 205-*a*-1. UE 115-*a* may forward the selected synchronization signal to one or more other UEs 115 by transmitting the selected synchronization signal via TRP 205-*a*-1 and TRP 205-*a*-2 (e.g., via each TRP 205-*a* of UE 115-*a*).

The priority of each TRP 205-*a* may be determined by an application layer of UE 115-*a*, a V2X layer of UE 115-*a*, or both (e.g., Layer 2) based on an amount of time that UE 115-*a* will be in a vicinity of UE 115-*b*, UE 115-*c*, and one or more other UEs 115 (e.g., synchronization signal source UEs 115) and a relative location or motion of the source UEs 115 with respect to each TRP 205-*a* of UE 115-*a*. UEs 115-*a*, 115-*b*, and 115-*c* may transmit signaling to one another to indicate location information for each respective device. UE 115-*a* may compare the indicated location information for nearby source UEs 115 with location information at UE 115-*a* to determine the priorities of each TRP 205-*a*. The UEs 115 may communicate the location information via basic safety messages (BSMs), or some other signaling, to indicate a location, motion, destination, or the like, for each UE 115.

In some examples, the selection rules 215 may be configured to instruct UE 115-*a* to select a synchronization signal based on one or more RSRP metrics. In one example, the selection rules 215 may instruct UE 115-*a* to select a synchronization signal received with an RSRP value that is greater than the RSRP values of other synchronization signals received at UE 115-*a* (e.g., a maximum RSRP value across all of the TRPs 205-*a*). For example, the selection rules 215 may be configured to instruct UE 115-*a* to select a synchronization signal (e.g., or a synchronization signal source), k, such that $$k = \operatorname*{argmax}_{m} RSRP_{mj},$$

where m indexes each synchronization signal of a number of synchronization signals (e.g., S synchronization signals) received at UE 115-*a* (e.g., m=1,2, . . . , S), and j indexes each TRP 205-*a* of a number of TRPs 205-*a* (e.g., T TRPs 205-*a*) at UE 115-*a*, t (e.g., j=1,2, . . . , T).

In another example, the selection rules 215 may instruct UE 115-*a* to select a synchronization signal based on a combined RSRP value across the TRPs 205-*a* of UE 115-*a*. Each TRP 205-*a* of UE 115-*a* may receive a synchronization signal with the same or different RSRP values, and UE 115-*a* may determine a combined RSRP value for a synchronization signal by adding the RSRP values associated with the synchronization signal at each TRP 205-*a*. UE 115-*a* may select a synchronization signal that has the highest combined RSRP value across all the TRPs 205-*a*. For example, UE 115-*a* may receive first and second synchronization signals at TRP 205-*a*-1 and TRP 205-*a*-2. The RSRP value of the first synchronization signal received at TRP 205-*a*-1 may be represented by $RSRP_{11}$ and the RSRP value of the first synchronization signal received at TRP 205-*a*-2 may be represented by $RSRP_{12}$. Similarly, the RSRP value of the second synchronization signal received at TRP 205-*a*-1 may be represented by $RSRP_{21}$ and the RSRP value of the second synchronization signal received at TRP 205-*a*-2 may be represented by $RSRP_{22}$. The selection rules 215 may instruct UE 115-*a* to select the first synchronization signal if $RSRP_{11}+RSRP_{12}>RSRP_{21}+RSRP_{22}$.

In another example, the selection rules 215 may instruct UE 115-*a* to select a synchronization signal based on a minimum RSRP value. UE 115-*a* may select a synchronization signal that has the highest minimum RSRP value across all the TRPs 205-*a*. If UE 115-*a* receives first and second synchronization signals, and determines that the minimum RSRP value of the first synchronization signal at any TRP 205-*a* is greater than the minimum RSRP value of the second synchronization signal at any TRP 205-*a* (e.g., $\min\{RSRP_{1j}\}>\min\{RSRP_{2j}\}$, where j=1,2, . . . , number of TRPs), UE 115-*a* will select the first synchronization signal.

In another example, the selection rules 215 may instruct UE 115-*a* to select a synchronization signal based on an RSRP variation across the TRPs 205-*a*. UE 115-*a* may determine a variation in received power across all the TRPs 205-*a* for each synchronization signal received at UE 115-*a*. The variation for a first synchronization signal may be determined by $|RSRP_{11}-RSRP_{12}- \ldots -RSRP_{1j}|$, where j is the number of TRPs 205-*a*. UE 115-*a* may select a synchronization signal that has the least RSRP variation (e.g., the most balanced received power across the TRPs 205-*a*). For example, if UE 115-*a* receives first and second synchronization signals at TRPs 205-*a*-1 and 205-*a*-2, and UE 115-*a* determines that the RSRP variation for the first synchronization signal is less than the RSRP variation for the second synchronization signal (e.g., $|RSRP_{11}-RSRP_{12}|<|RSRP_{21}-RSRP_{22}|$), UE 115-*a* will select the first synchronization signal.

The RSRP metrics for the synchronization signals may vary at each TRP 205-*a* based on the source devices transmitting the synchronization signals, interference between the source devices and each TRP 205-*a* of UE 115-*a*, a transmit power for each synchronization signal, or the like. For example, a first synchronization signal received at TRP 205-*a*-1 of UE 115-*a* may be received from a device that is far away from TRP 205-*a*-1, or there may be interference between the device and TRP 205-*a*-1, which may result in a relatively low RSRP value of the synchronization signal at TRP 205-*a*-1.

As described herein, the selection rules 215 may be configured to provide instructions for a UE 115, such as UE 115-*a*, to select a synchronization signal from multiple synchronization signals received across TRPs 205 of the UE 115. By selecting the synchronization signal based on the selection rules 215, the UE 115 may avoid ambiguity in terms of which synchronization signal to select when one or more synchronization signals are received with different comparative signal metrics at different TRPs 205 of the UE 115. The selection rules 215 may provide instructions for the UE 115 to efficiently select a pertinent synchronization signal to derive accurate and relevant timing for the UE 115.

Figure 3:
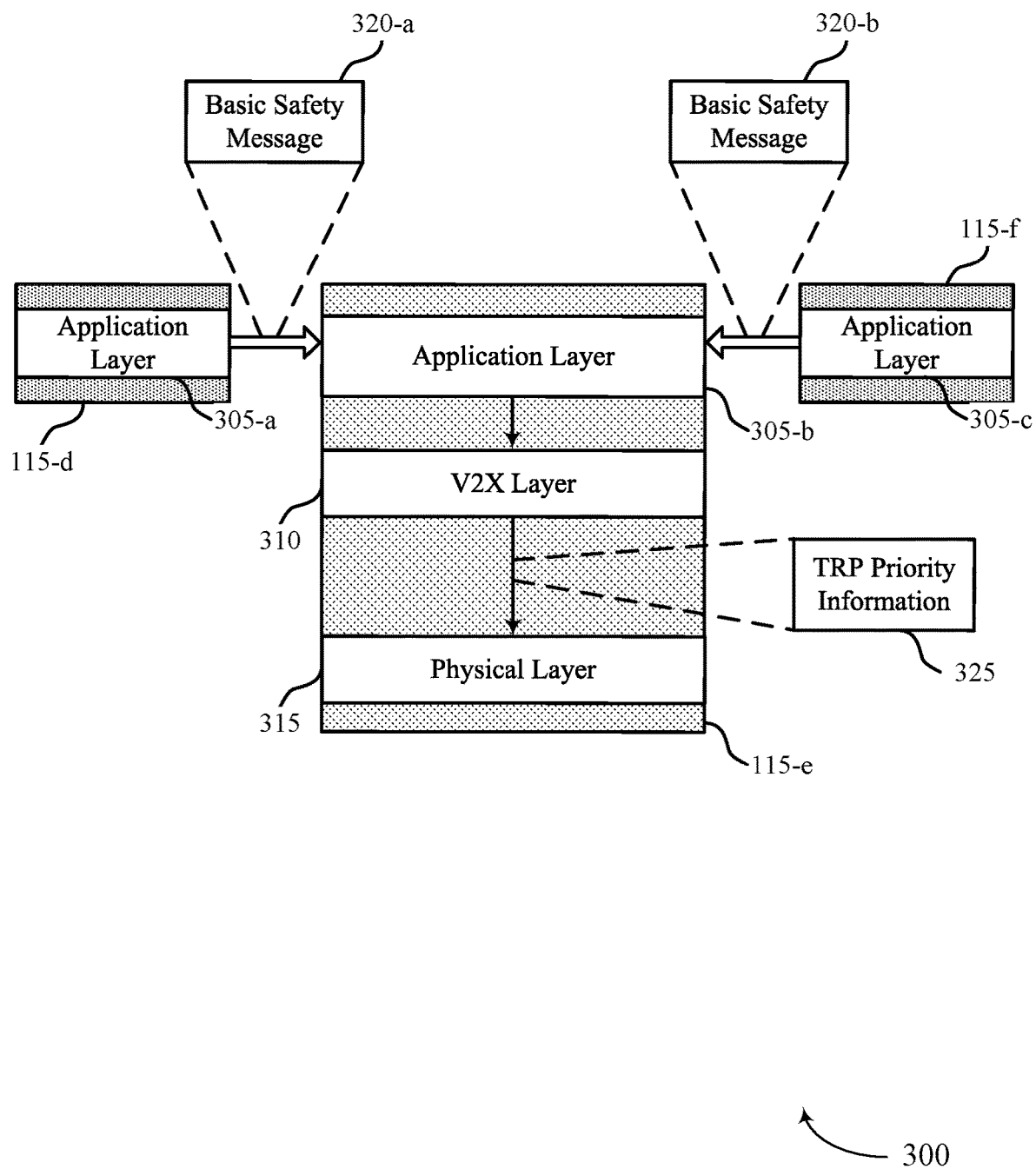
FIG. 3 illustrates an example of a protocol layer stack configuration that supports synchronization signal selection across multiple transceiver nodes in accordance with aspects of the present disclosure.

FIG. 3 illustrates an example of a protocol layer stack configuration 300 that supports synchronization signal selection across multiple transceiver nodes in accordance with aspects of the present disclosure. The protocol layer stack configuration 300 may illustrate protocol layer stacks for UEs 115-*d*, 115-*e*, and 115-*f*, which may be examples of UEs 115 as described with reference to FIGS. 1 and 2. UEs 115-*d*, 115-*e*, and 115-*f* may include an application layer 305 and a V2X layer 310 (e.g., Layer 2 sublayers), a physical layer 315 (e.g., Layer 1), or a combination thereof. In some examples, UEs 115-*d*, 115-*e*, and 115-*f* may be VUEs 115. Application layer 305-*b* and the V2X layer 310 of UE 115-*e* may determine a priority associated with each TRP of UE 115-*e* based on information received via BSMs 320-*a* and 320-*b*.

UE 115-*e* may be an example of UE 115-*a* as described with reference to FIG. 2. For example, UE 115-*e* may include multiple TRPs and may receive synchronization signals from one or more other UEs 115, such as UEs 115-*d* and 115-*f*. As described with reference to FIG. 2, UE 115-*e* may be configured with rules for selecting a synchronization signal. UEs 115-*d* and 115-*f* may be referred to as source UEs 115. Source UEs 115-*d* and 115-*f* may transmit synchronization signals to UE 115-*e* and one or more other UEs 115. In some examples, source UEs 115-*d* and 115-*f* may be VUEs, may include multiple TRPs, or both.

The application layers 305 of each of UEs 115-*d*, 115-*e*, and 115-*f* may store state information for applications of the respective UEs 115. For example, the application layers 305 may store a destination, location, speed, acceleration, direction, other parameters, or a combination thereof for each UE 115 (e.g., VUEs 115, such as cars). The UEs 115 may communicate the state information via the BSMs 320. Application layer 305-c of UE 115-*f* may transmit BSM 320*b* to UE 115-*e* and application layer 305-*a* of UE 115-*d* may transmit BSM 320*a* to UE 115-*e*. The BSMs 320 may be transmitted periodically (e.g., every second, or some other time period), based on a trigger, or both, to enable crash avoidance, automated driving, efficient mobility, reduced commerce, and other applications of the UEs 115.

Application layer 305-b of UE 115-e may receive BSMs 320a and 320b and may decode the BSMs 320 to obtain the state information (e.g., an intent) of source UEs 115-d and 115-f. Application layer 305-b may determine a time period that each source UE 115 will be in the vicinity of UE 115-e (e.g., within a threshold distance of UE 115-f) based on the state information. Application layer 305-b may determine that UE 115-d will be within the threshold distance of UE 115-e for $T_1$ seconds or more and UE 115-f will be within the threshold distance of UE 115-e for $T_2$ seconds or less, where $T_1$ and $T_2$ are time periods. $T_1$ and $T_2$ may represent any duration of time. In some examples, UE 115-e may be configured with threshold time periods $T_1$ and $T_2$. For example, application layer 305-b may determine whether the other UEs 115 will be in the vicinity of UE 115-e for longer than the configured threshold time periods $T_1$ and $T_2$.

Application layer 305-b may provide the determined time periods and relevant state information of UEs 115-d and 115-f to the V2X layer 310 of UE 115-e. The V2X layer 310 may map the information to a priority scale for each TRP of UE 115-e to determine TRP priority information 325. The priority scale may be a configured priority scale at the V2X layer 310. The V2X layer 310 may map the information to the priority scale based on a second set of time periods that the source UEs 115 will be in the vicinity of each TRP of UE 115-e. For example, the V2X layer 310 may determine intended destinations, current directions of motion relative to each TRP, or both, of UE 115-d and UE 115-f, and the V2X layer 310 may determine a time period (e.g., a projected time period) that each UE 115 will be within a threshold distance of the TRPs, within a threshold distance of UE 115-e, or both. Additionally or alternatively, the V2X layer 310 may map the TRPs to a priority scale based on a relative location, a relative speed, a relative acceleration, or the like, of UEs 115-d and 115-f with respect to each TRP of UE 115-e. The V2X layer 310 of UE 115-e may map the information by comparing the state information for UEs 115-d and 115-f with state information for UE 115-e.

The V2X layer 310 may forward the TRP priority information 325 for each TRP to the physical layer 315 of UE 115-e. The physical layer 315 may select a synchronization signal from one or more synchronization signals received at UE 115-e based on the TRP priority information 325. For example, if a first synchronization signal, $S_1$, and a second synchronization signal, $S_2$, are received at a first TRP of UE 115-e (e.g., TRP1) such that the RSRP of $S_1$ at TRP1 is greater than the RSRP of $S_2$ at TRP1, and $S_1$ and $S_2$ are received at a second TRP of UE 115-e, TRP2, such that the RSRP of $S_1$ at TRP2 is less than the RSRP of $S_2$ at TRP2, the physical layer 315 may select a synchronization signal based on which synchronization signal is received with the highest RSRP at the highest priority TRP. In one example, the physical layer 315 may determine that TRP1 of UE 115-e has a higher priority than TRP2 of UE 115-e based on the TRP priority information 325 from the V2X layer 310. The physical layer 315 may select synchronization signal $S_1$ because $S_1$ is received at TRP1 (e.g., the higher priority TRP) with a higher RSRP than $S_2$.

When the physical layer 315 of UE 115-e selects a synchronization signal, UE 115-e may transmit the selected synchronization signal from each TRP of UE 115-e. UE 115-e may transmit (e.g., broadcast) the selected synchronization signal to forward the synchronization signal and the corresponding timing and synchronization information to one or more other UEs 115.

In some examples, a fourth UE 115 (not pictured) may transmit a BSM 320 to UE 115-e. Application layer 305-b of UE 115-e may receive the BSM 320 and forward the provided state information for the fourth UE 115 to the V2X layer 310 of UE 115-e. The V2X layer 310 may determine a relative motion, location, and the like, for the fourth UE 115 based on the state information, and may reconfigure the previously mapped priorities of TRP1, TRP2, and one or more other TRPs of UE 115-e. For example, if the V2X layer 310 determines that a relative location or motion of the fourth UE 115 with respect to TRP2 may result in the fourth UE 115 providing better timing for UE 115-e than other synchronization sources, such as UEs 115-d and 115-f (e.g., a more reliable source, a more accurate source, or both), the V2X layer 310 reconfigures the priority of TRP2 to be higher than the priority of TRP1.

The V2X layer 310 may forward the reconfigured TRP priority information 325 to the physical layer 315, and the physical layer may select a synchronization signal (e.g., a new synchronization signal) based on the TRP priority information 325. For example, if first, second, and third synchronization signals, $S_1$, $S_2$, and $S_3$ are received from UE 115-d, UE 115-f, and the fourth UE 115, respectively, such that $S_1$ is received with the highest RSRP at TRP1 of UE 115-e (e.g., $S_1 > S_2 > S_3$) and $S_3$ is received with the highest RSRP at TRP2 of UE 115-e (e.g., $S_3 > S_2 > S_1$), the physical layer 315 may select the third synchronization signal, $S_3$, because the third synchronization signal was received with the highest RSRP at the highest priority TRP (e.g., TRP2). UE 115-e may transmit the third synchronization signal from each TRP of UE 115-e based on the selection.

Figure 4:
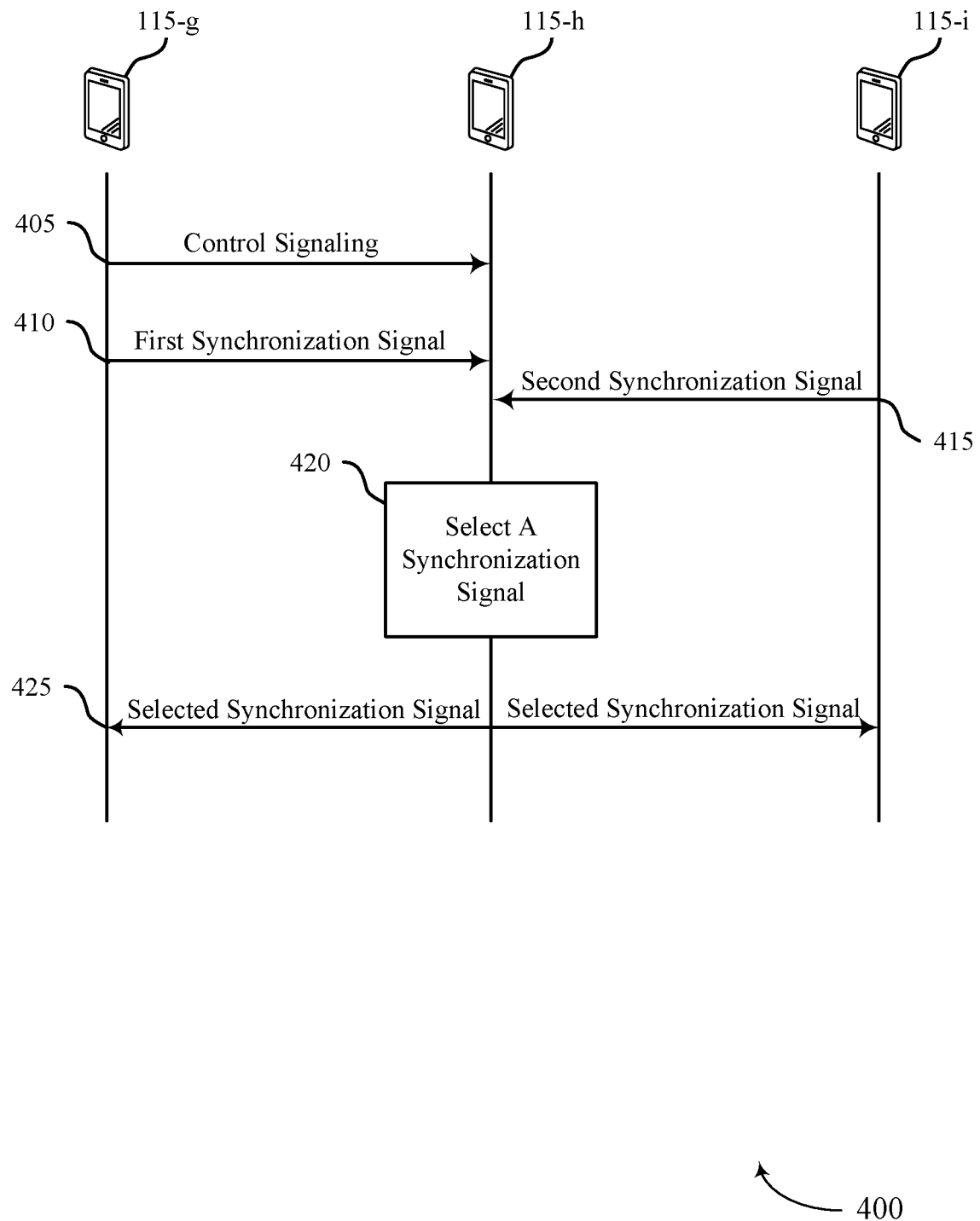
FIG. 4 illustrates an example of a process flow that supports synchronization signal selection across multiple transceiver nodes in accordance with aspects of the present disclosure.

FIG. 4 illustrates an example of a process flow 400 that supports synchronization signal selection across multiple transceiver nodes in accordance with aspects of the present disclosure. The process flow 400 may implement various aspects of the present disclosure described with reference to FIGS. 1-3. The process flow 400 may include UE 115-g, UE 115-h, and UE 115-i, which may be examples of UEs 115 as described with reference to FIGS. 1-3. In some examples, the UEs 115 may be VUEs, or some other device. UE 115-h may be configured with one or more selection rules for selecting a synchronization signal from multiple synchronization signals received at one or more TRPs of UE 115-h.

In the following description of the process flow 400, the operations between the UEs 115 may be performed in different orders or at different times. Certain operations may also be left out of the process flow 400, or other operations may be added. It is to be understood that while two processing times are shown between three UEs 115, any number of UEs 115 or other devices may transmit and receive synchronization signals and select a synchronization signal based on configured selection rules.

At 405, UE 115-g may transmit control signaling to UE 115-h. The control signaling may indicate a rule (e.g., a selection rule) for selecting between one or more synchronization signals received at TRPs of UE 115-h. The control signaling may indicate one or more selection thresholds (e.g., RSRP thresholds, timing thresholds, or the like). Additionally or alternatively, UE 115-h may receive second control signaling indicating the selection thresholds. In some examples, the selection rules and/or the selection thresholds may be configured at UE 115-h. In some examples, the control signaling indicating the selection rule may be transmitted by another UE 115, a base station 105, a roadside unit, some other device, or a combination thereof.

At 410, UE 115-g may transmit a first synchronization signal to UE 115-h. At 415, UE 115-i may transmit a second synchronization signal to UE 115-h. UEs 115-g and 115-i may be referred to as synchronization signal source UEs 115. The first and second synchronization signals may include first and second timing and synchronization information, respectively.

At 420, UE 115-*h* may select a synchronization signal from the first synchronization signal and the second synchronization signal based on the selection rule. UE 115-*h* may select the synchronization signal for deriving a timing at UE 115-*h*. As described in detail with reference to FIG. 3, the selection rule may instruct UE 115-*h* to measure an RSRP value associated with each synchronization signal, obtain timing from each synchronization signal, determine a priority of TRPs of UE 115-*h* that receive the synchronization signals, or a combination thereof to determine which synchronization signal to select. UE 115-*h* may decode the selected synchronization signal to obtain the timing for UE 115-*h*.

At 425, UE 115-*h* may forward the selected synchronization signal to UE 115-*g*, UE 115-*i*, and one or more other UEs 115. UE 115-*h* may forward the selected synchronization signal by transmitting (e.g., broadcasting) the selected synchronization signal using each TRP of UE 115-*h*. By forwarding the selected synchronization signal, UE 115-*h* may provide timing for other devices.

Figure 5:
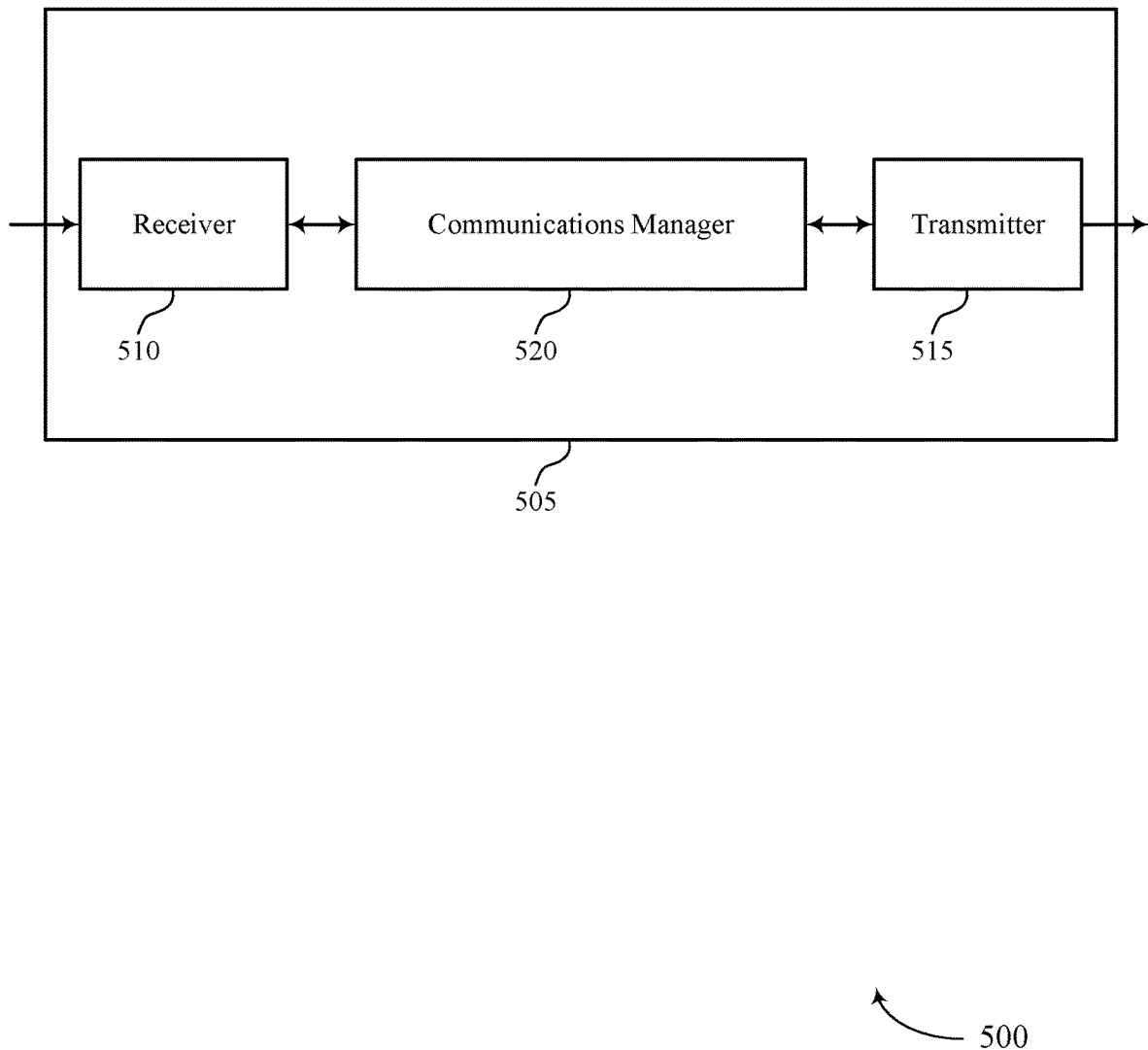
FIGS. 5 and 6 show block diagrams of devices that support synchronization signal selection across multiple transceiver nodes in accordance with aspects of the present disclosure.

FIG. 5 shows a block diagram 500 of a device 505 that supports synchronization signal selection across multiple transceiver nodes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to synchronization signal selection across multiple transceiver nodes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to synchronization signal selection across multiple transceiver nodes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of synchronization signal selection across multiple transceiver nodes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving control signaling indicating a rule for selecting between a first synchronization signal received at a first transceiver node of the UE and a second synchronization signal received at a second transceiver node of the UE. The communications manager 520 may be configured as or otherwise support a means for selecting, from the first synchronization signal and the second synchronization signal based on the rule, a synchronization signal for deriving a timing at the UE. The communications manager 520 may be configured as or otherwise support a means for forwarding the selected synchronization signal to one or more other UEs based on the selecting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption. By selecting a synchronization signal based on a configured selection rule, the processor of the device 505 may avoid ambiguity, which may allow for the processor to select a synchronization signal having more accurate or relevant timing for the device 505. The processor may thereby reduce processing and power consumption by using the accurate timing for synchronization and communications.

Figure 6:
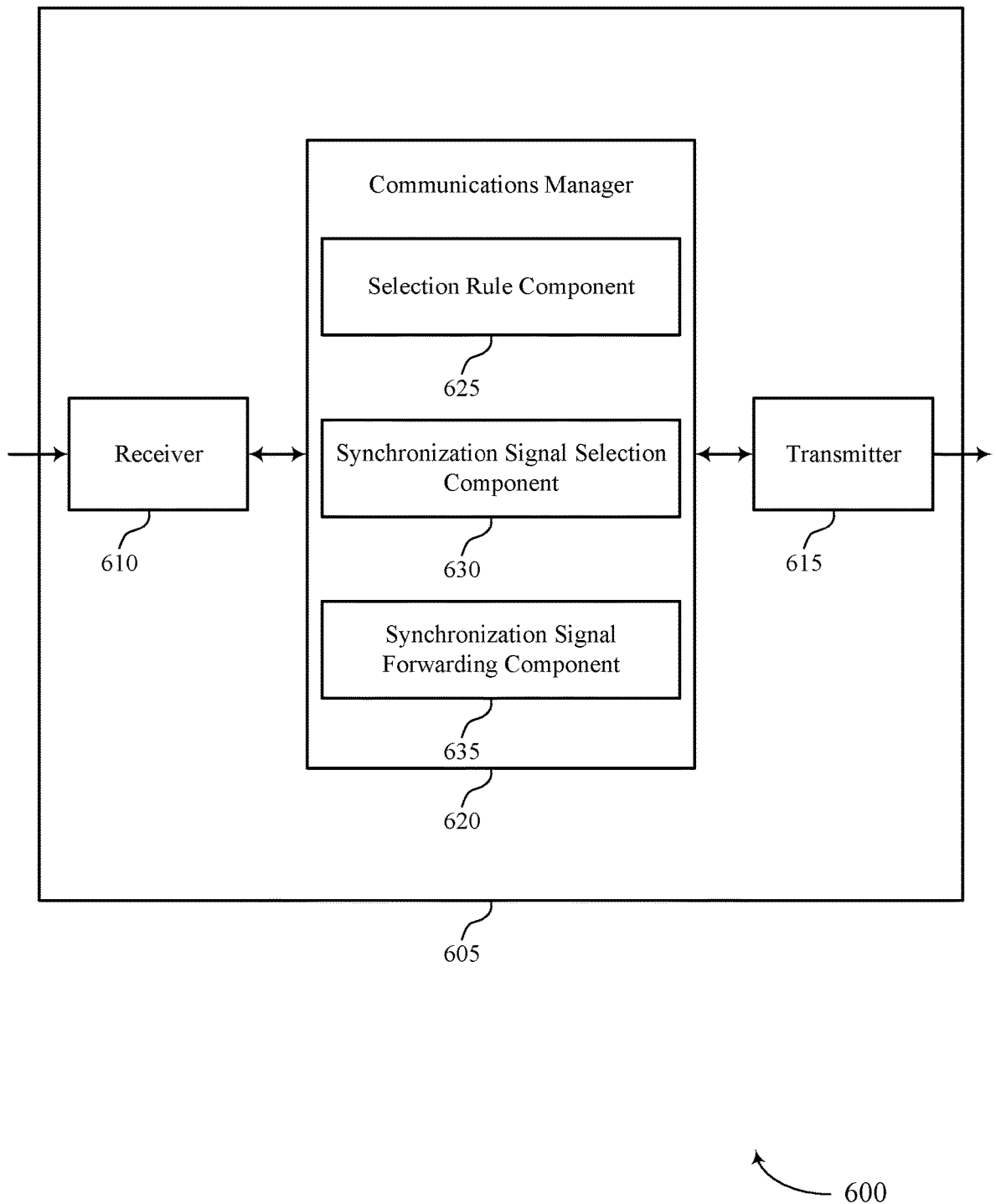

FIG. 6 shows a block diagram 600 of a device 605 that supports synchronization signal selection across multiple transceiver nodes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to synchronization signal selection across multiple transceiver nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to synchronization signal selection across multiple transceiver nodes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of synchronization signal selection across multiple transceiver nodes as described herein. For example, the communications manager 620 may include a selection rule component 625, a synchronization signal selection component 630, a synchronization signal forwarding component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The selection rule component 625 may be configured as or otherwise support a means for receiving control signaling indicating a rule for selecting between a first synchronization signal received at a first transceiver node of the UE and a second synchronization signal received at a second transceiver node of the UE. The synchronization signal selection component 630 may be configured as or otherwise support a means for selecting, from the first synchronization signal and the second synchronization signal based on the rule, a synchronization signal for deriving a timing at the UE. The synchronization signal forwarding component 635 may be configured as or otherwise support a means for forwarding the selected synchronization signal to one or more other UEs based on the selecting.

Figure 7:
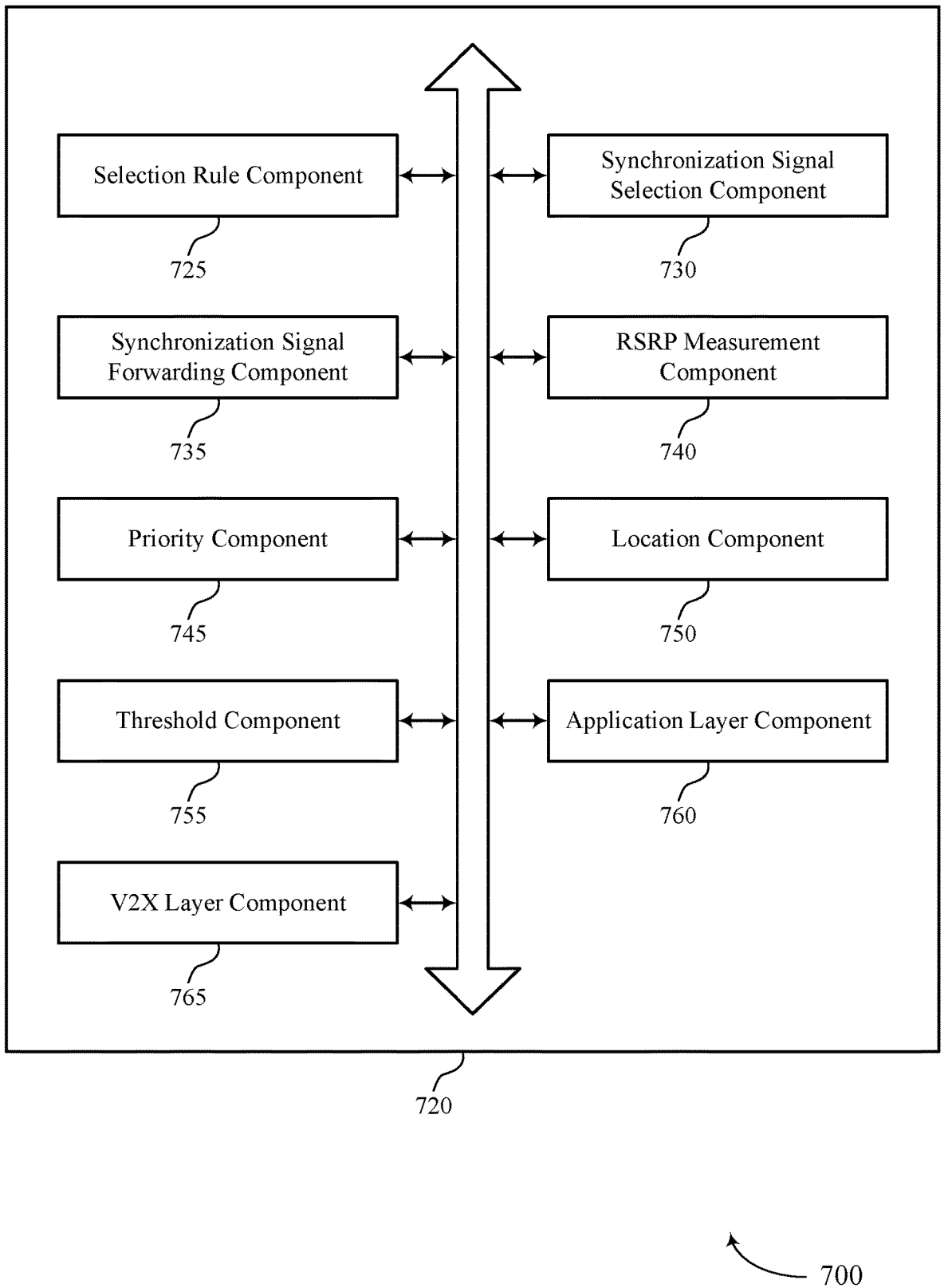
FIG. 7 shows a block diagram of a communications manager that supports synchronization signal selection across multiple transceiver nodes in accordance with aspects of the present disclosure.

FIG. 7 shows a block diagram 700 of a communications manager 720 that supports synchronization signal selection across multiple transceiver nodes in accordance with aspects of the present disclosure. The communications manager 720 may be an example of aspects of a communications manager 520, a communications manager 620, or both, as described herein. The communications manager 720, or various components thereof, may be an example of means for performing various aspects of synchronization signal selection across multiple transceiver nodes as described herein. For example, the communications manager 720 may include a selection rule component 725, a synchronization signal selection component 730, a synchronization signal forwarding component 735, an RSRP measurement component 740, a priority component 745, a location component 750, a threshold component 755, an application layer component 760, a V2X layer component 765, or any combination thereof. Each of these components may communicate, directly or indirectly, with one another (e.g., via one or more buses).

The communications manager 720 may support wireless communications at a UE in accordance with examples as disclosed herein. The selection rule component 725 may be configured as or otherwise support a means for receiving control signaling indicating a rule for selecting between a first synchronization signal received at a first transceiver node of the UE and a second synchronization signal received at a second transceiver node of the UE. The synchronization signal selection component 730 may be configured as or otherwise support a means for selecting, from the first synchronization signal and the second synchronization signal based on the rule, a synchronization signal for deriving a timing at the UE. The synchronization signal forwarding component 735 may be configured as or otherwise support a means for forwarding the selected synchronization signal to one or more other UEs based on the selecting.

In some examples, the rule indicates signal quality comparison metrics for selecting the synchronization signal from the first synchronization signal and the second synchronization signal.

In some examples, the RSRP measurement component 740 may be configured as or otherwise support a means for measuring a first RSRP value associated with the first synchronization signal and a second RSRP value associated with the second synchronization signal. In some examples, the selection rule component 725 may be configured as or otherwise support a means for determining that the first RSRP value is greater than the second RSRP value at the first transceiver node and the second RSRP value is greater than the first RSRP value at the second transceiver node, the first RSRP value and the second RSRP value are both greater than an RSRP threshold, and a difference between a maximum timing and a minimum timing of the first synchronization signal and the second synchronization signal is less than a timing threshold. In some examples, the synchronization signal selection component 730 may be configured as or otherwise support a means for selecting the synchronization signal randomly from the first synchronization signal or the second synchronization signal based on the determining.

In some examples, the threshold component 755 may be configured as or otherwise support a means for receiving control signaling indicating the RSRP threshold and the timing threshold. In some examples, the RSRP threshold, the timing threshold, or both, are based on a quantity of synchronization signals received at the UE, a quantity of transceiver nodes at the UE, or both.

In some examples, the RSRP measurement component 740 may be configured as or otherwise support a means for measuring a first RSRP value associated with the first synchronization signal and a second RSRP value associated with the second synchronization signal. In some examples, the priority component 745 may be configured as or otherwise support a means for identifying a first priority of the first transceiver node and a second priority of the second transceiver node. In some examples, the selection rule component 725 may be configured as or otherwise support a means for determining that the first RSRP value is greater than the second RSRP value at the first transceiver node and the second RSRP value is greater than the first RSRP value at the second transceiver node, the first RSRP value and the second RSRP value are greater than an RSRP threshold, and the first priority is greater than the second priority. In some examples, the synchronization signal selection component 730 may be configured as or otherwise support a means for selecting the first synchronization signal based on the determining.

In some examples, the threshold component 755 may be configured as or otherwise support a means for receiving control signaling indicating the RSRP threshold. In some examples, the RSRP threshold is determined based on a quantity of transceiver nodes at the UE, a quantity of synchronization signals received at the UE, or both.

In some examples, the location component 750 may be configured as or otherwise support a means for receiving signaling from one or more source UEs, where the signaling indicates a set of location parameters associated with the one or more source UEs. In some examples, the location component 750 may be configured as or otherwise support a means for determining a duration that the one or more source UEs will be within a threshold distance of the UE based on the set of location parameters. In some examples, the priority component 745 may be configured as or otherwise support a means for determining a first priority of the first transceiver node and a second priority of the second transceiver node based on the duration. In some examples, the set of location parameters includes a relative location, a relative motion, a destination, or a combination thereof for each source UE of the one or more source UEs.

In some examples, to support determining the first priority and the second priority, the location component 750 may be configured as or otherwise support a means for comparing the set of location parameters with location information associated with the UE. In some examples, to support determining the first priority and the second priority, the location component 750 may be configured as or otherwise support a means for determining that the one or more source UEs will be within a first threshold distance of the first transceiver node for a first time period and that the one or more source UEs will be within a second threshold distance of the second transceiver node for a second time period. In some examples, to support determining the first priority and the second priority, the priority component 745 may be configured as or otherwise support a means for determining the first priority and the second priority based on the first time period, the second time period, and a priority scale.

In some examples, the application layer component 760 may be configured as or otherwise support a means for receiving the signaling at an application layer of the UE. In some examples, the application layer component 760 may be configured as or otherwise support a means for determining the first time period and the second time period at the application layer of the UE. In some examples, the V2X layer component 765 may be configured as or otherwise support a means for determining the first priority and the second priority at a V2X layer of the UE based on the first time period, the second time period, and the priority scale. In some examples, the synchronization signal selection component 730 may be configured as or otherwise support a means for selecting the synchronization signal at a physical layer of the UE based on the first priority and the second priority.

In some examples, to support selecting, the selection rule component 725 may be configured as or otherwise support a means for determining a highest RSRP value of a first RSRP value associated with the first synchronization signal at the first transceiver node and the second transceiver node and a second RSRP value associated with the second synchronization signal at the first transceiver node and the second transceiver node. In some examples, to support selecting, the synchronization signal selection component 730 may be configured as or otherwise support a means for selecting the synchronization signal based on the synchronization signal having the highest RSRP value.

In some examples, to support selecting, the selection rule component 725 may be configured as or otherwise support a means for determining a first combined RSRP value for the first synchronization signal at the first transceiver node and the second transceiver node and a second combined RSRP value for the second synchronization signal at the first transceiver node and the second transceiver node. In some examples, to support selecting, the synchronization signal selection component 730 may be configured as or otherwise support a means for selecting the synchronization signal based on the synchronization signal having a highest combined RSRP value of the first combined RSRP value and the second combined RSRP value.

In some examples, to support selecting, the selection rule component 725 may be configured as or otherwise support a means for determining a highest minimum RSRP value from a first minimum RSRP value associated with the first synchronization signal and a second minimum RSRP value associated with the second synchronization signal. In some examples, to support selecting, the synchronization signal selection component 730 may be configured as or otherwise support a means for selecting the synchronization signal based on the synchronization signal having the highest minimum RSRP value.

In some examples, to support selecting, the selection rule component 725 may be configured as or otherwise support a means for determining a minimum RSRP variation between a first RSRP variation and a second RSRP variation, where the first RSRP variation is based on a difference between a first RSRP value associated with the first synchronization signal at the first transceiver node and a second RSRP value associated with the first synchronization signal at the second transceiver node and the second RSRP variation is based on a difference between a third RSRP value associated with the second synchronization signal at the first transceiver node and a fourth RSRP value associated with the second synchronization signal at the second transceiver node. In some examples, to support selecting, the synchronization signal selection component 730 may be configured as or otherwise support a means for selecting the synchronization signal based on the synchronization signal having the minimum RSRP variation.

In some examples, to support forwarding, the synchronization signal forwarding component 735 may be configured as or otherwise support a means for transmitting the selected synchronization signal to the one or more other UEs using the first transceiver node and the second transceiver node. In some examples, the first transceiver node and the second transceiver node include one or more transmitter and receiver components. In some examples, the UE is a vehicle UE.

Figure 8:
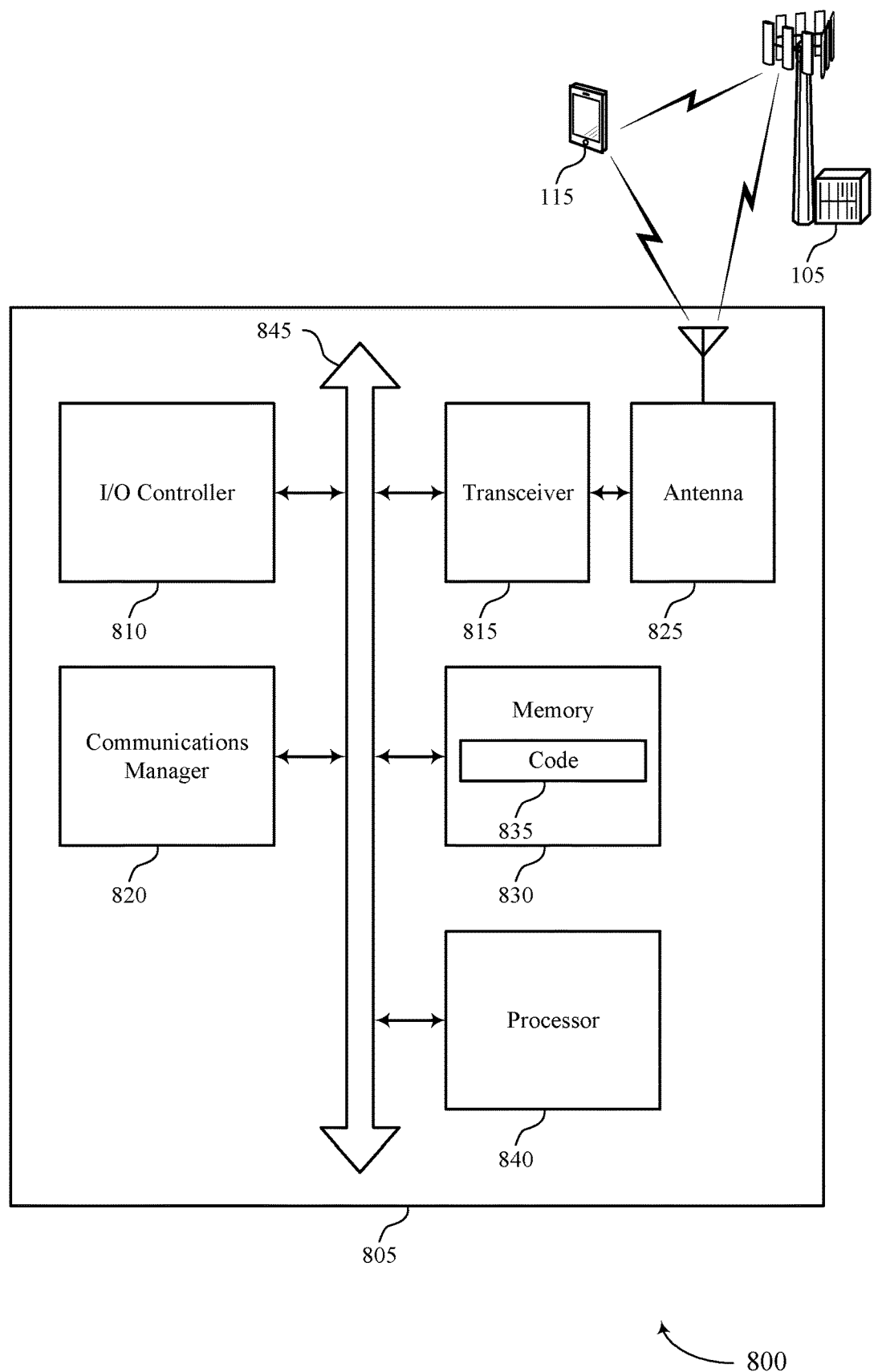
FIG. 8 shows a diagram of a system including a device that supports synchronization signal selection across multiple transceiver nodes in accordance with aspects of the present disclosure.

FIG. 8 shows a diagram of a system 800 including a device 805 that supports synchronization signal selection across multiple transceiver nodes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting synchronization signal selection across multiple transceiver nodes). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a rule for selecting between a first synchronization signal received at a first transceiver node of the UE and a second synchronization signal received at a second transceiver node of the UE. The communications manager 820 may be configured as or otherwise support a means for selecting, from the first synchronization signal and the second synchronization signal based on the rule, a synchronization signal for deriving a timing at the UE. The communications manager 820 may be configured as or otherwise support a means for forwarding the selected synchronization signal to one or more other UEs based on the selecting.

By including or configuring the communications manager 820 in accordance with examples as described herein, the device 805 may support techniques for improved communication reliability, reduced latency, and improved coordination between devices. By selecting a synchronization signal based on one or more configured selection rules, the device 805 may select a synchronization signal that has relevant and accurate timing for the device 805. For example, the selection rules may provide instructions (e.g., logical statements) for the device 805 to select a synchronization signal, which may reduce ambiguity during selection of a synchronization signal by the device 805 and reduce latency. Additionally or alternatively, by selecting a synchronization signal for deriving timing for the device 805 based on the selection rules, the device 805 may derive timing for the device 805 from a more accurate synchronization signal source than if the device 805 (e.g., a UE 115 that receives the synchronization signals across multiple TRPs) selects a synchronization signal randomly or based on received power metrics alone, which may improve communication reliability and communication between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of synchronization signal selection across multiple transceiver nodes as described herein, or the processor 840 and the memory 830 may be otherwise configured to perform or support such operations.

Figure 9:
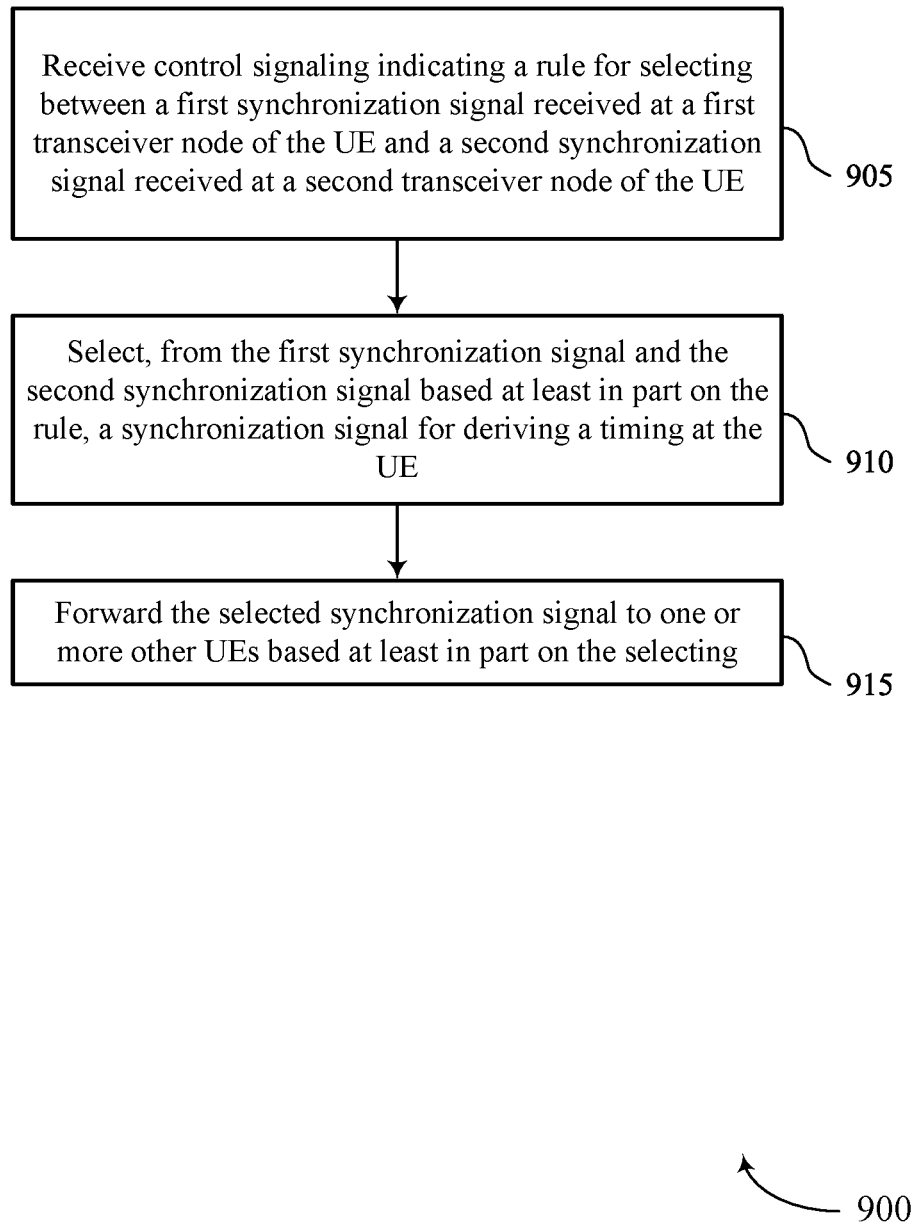
FIGS. 9 through 12 show flowcharts illustrating methods that support synchronization signal selection across multiple transceiver nodes in accordance with aspects of the present disclosure.

FIG. 9 shows a flowchart illustrating a method 900 that supports synchronization signal selection across multiple transceiver nodes in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving control signaling indicating a rule for selecting between a first synchronization signal received at a first transceiver node of the UE and a second synchronization signal received at a second transceiver node of the UE. The operations of 905 may be performed in accordance with examples as disclosed herein. In some examples, aspects of the operations of 905 may be performed by a selection rule component 725 as described with reference to FIG. 7.

At 910, the method may include selecting, from the first synchronization signal and the second synchronization signal based on the rule, a synchronization signal for deriving a timing at the UE. The operations of 910 may be performed in accordance with examples as disclosed herein. In some examples, aspects of the operations of 910 may be performed by a synchronization signal selection component 730 as described with reference to FIG. 7.

At 915, the method may include forwarding the selected synchronization signal to one or more other UEs based on the selecting. The operations of 915 may be performed in accordance with examples as disclosed herein. In some examples, aspects of the operations of 915 may be performed by a synchronization signal forwarding component 735 as described with reference to FIG. 7.

Figure 10:
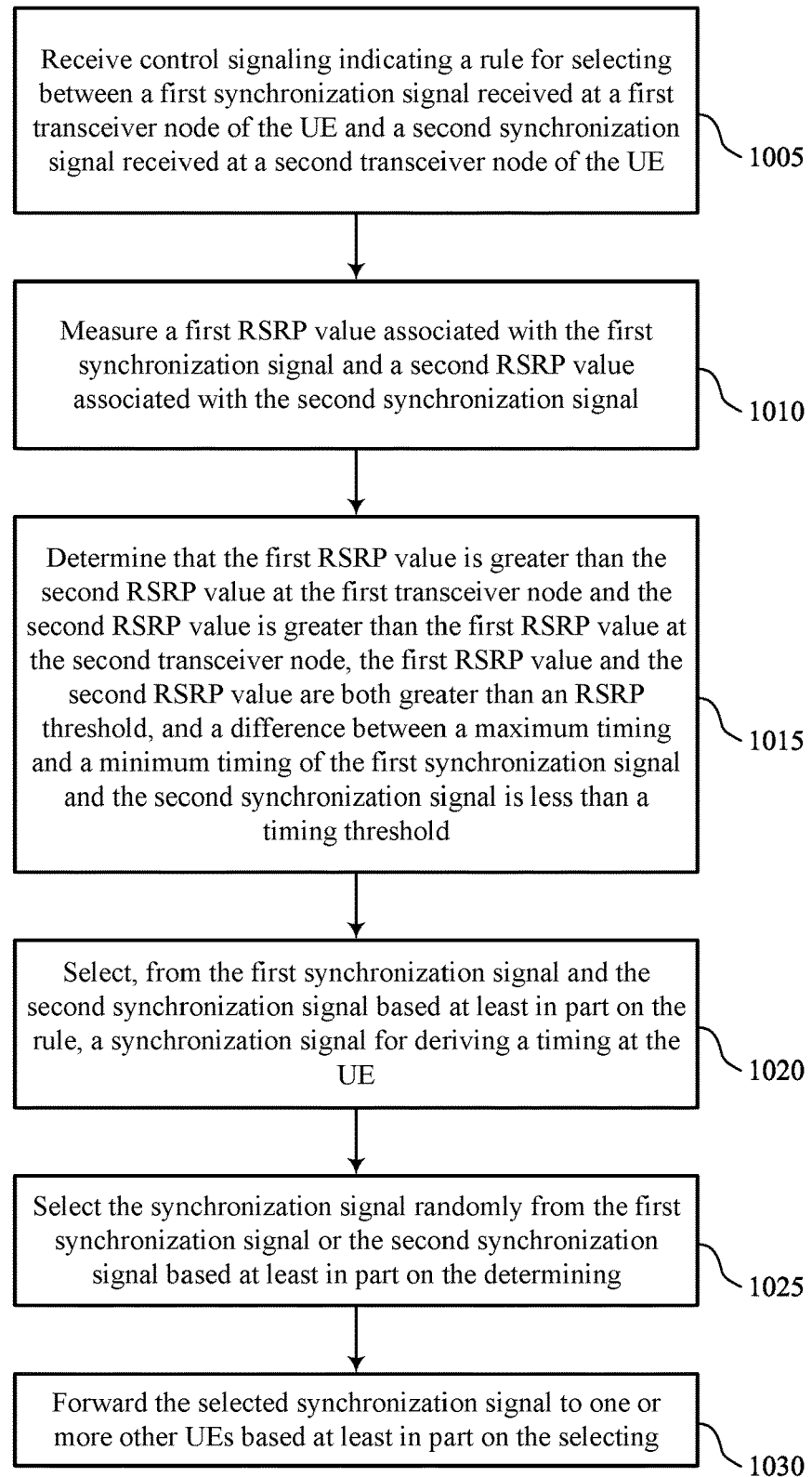

FIG. 10 shows a flowchart illustrating a method 1000 that supports synchronization signal selection across multiple transceiver nodes in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a rule for selecting between a first synchronization signal received at a first transceiver node of the UE and a second synchronization signal received at a second transceiver node of the UE. The operations of 1005 may be performed in accordance with examples as disclosed herein. In some examples, aspects of the operations of 1005 may be performed by a selection rule component 725 as described with reference to FIG. 7.

At 1010, the method may include measuring a first RSRP value associated with the first synchronization signal and a second RSRP value associated with the second synchronization signal. The operations of 1010 may be performed in accordance with examples as disclosed herein. In some examples, aspects of the operations of 1010 may be performed by an RSRP measurement component 740 as described with reference to FIG. 7.

At 1015, the method may include determining that the first RSRP value is greater than the second RSRP value at the first transceiver node and the second RSRP value is greater than the first RSRP value at the second transceiver node, the first RSRP value and the second RSRP value are both greater than an RSRP threshold, and a difference between a maximum timing and a minimum timing of the first synchronization signal and the second synchronization signal is less than a timing threshold. The operations of 1015 may be performed in accordance with examples as disclosed herein. In some examples, aspects of the operations of 1015 may be performed by a selection rule component 725 as described with reference to FIG. 7.

At 1020, the method may include selecting, from the first synchronization signal and the second synchronization signal based on the rule, a synchronization signal for deriving a timing at the UE. The operations of 1020 may be performed in accordance with examples as disclosed herein. In some examples, aspects of the operations of 1020 may be performed by a synchronization signal selection component 730 as described with reference to FIG. 7.

At 1025, the method may include selecting the synchronization signal randomly from the first synchronization signal or the second synchronization signal based on the determining. The operations of 1025 may be performed in accordance with examples as disclosed herein. In some examples, aspects of the operations of 1025 may be performed by a synchronization signal selection component 730 as described with reference to FIG. 7.

At 1030, the method may include forwarding the selected synchronization signal to one or more other UEs based on the selecting. The operations of 1030 may be performed in accordance with examples as disclosed herein. In some examples, aspects of the operations of 1030 may be performed by a synchronization signal forwarding component 735 as described with reference to FIG. 7.

Figure 11:
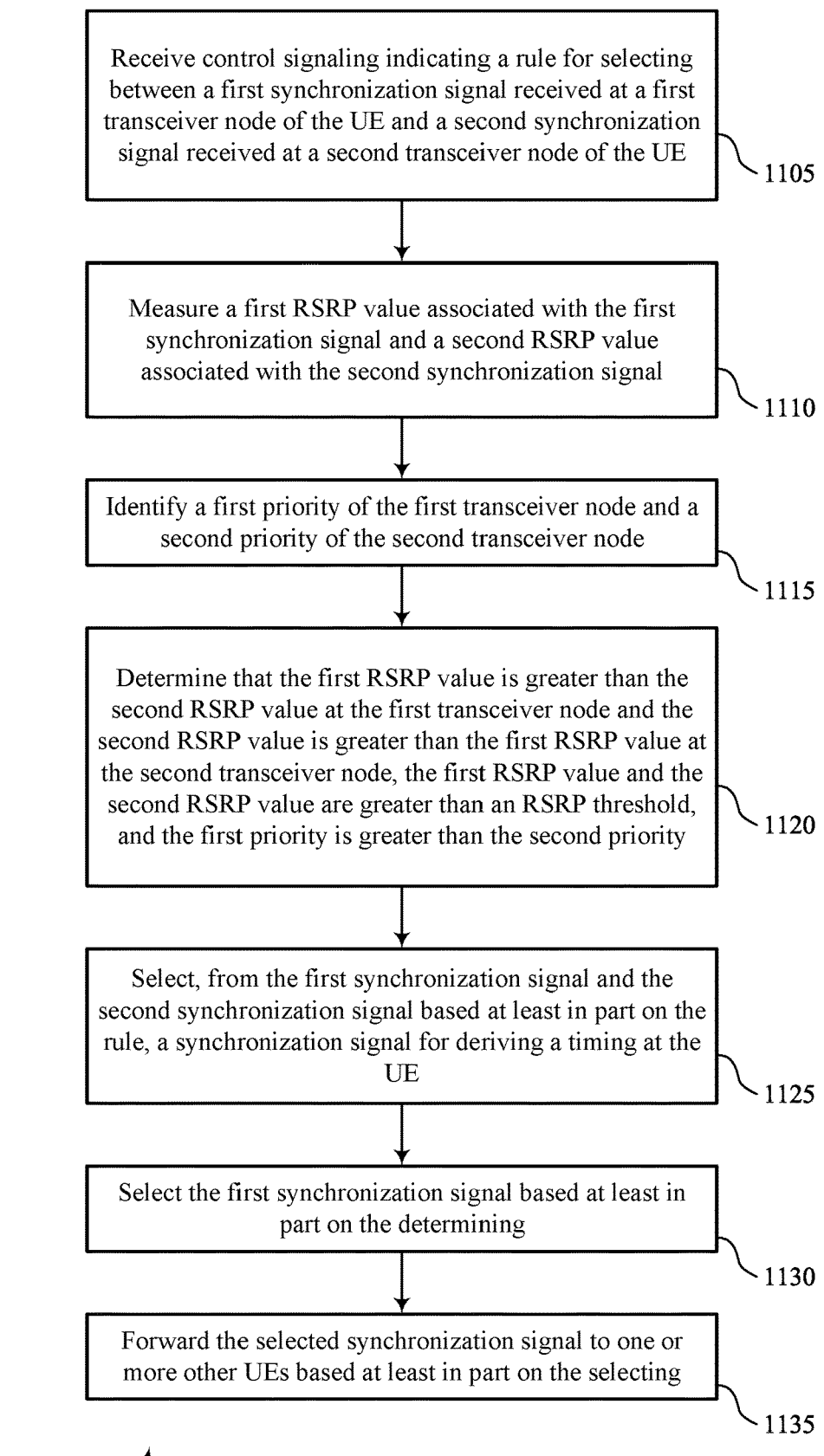

FIG. 11 shows a flowchart illustrating a method 1100 that supports synchronization signal selection across multiple transceiver nodes in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a rule for selecting between a first synchronization signal received at a first transceiver node of the UE and a second synchronization signal received at a second transceiver node of the UE. The operations of 1105 may be performed in accordance with examples as disclosed herein. In some examples, aspects of the operations of 1105 may be performed by a selection rule component 725 as described with reference to FIG. 7.

At 1110, the method may include measuring a first RSRP value associated with the first synchronization signal and a second RSRP value associated with the second synchronization signal. The operations of 1110 may be performed in accordance with examples as disclosed herein. In some examples, aspects of the operations of 1110 may be performed by an RSRP measurement component 740 as described with reference to FIG. 7.

At 1115, the method may include identifying a first priority of the first transceiver node and a second priority of the second transceiver node. The operations of 1115 may be performed in accordance with examples as disclosed herein. In some examples, aspects of the operations of 1115 may be performed by a priority component 745 as described with reference to FIG. 7.

At 1120, the method may include determining that the first RSRP value is greater than the second RSRP value at the first transceiver node and the second RSRP value is greater than the first RSRP value at the second transceiver node, the first RSRP value and the second RSRP value are greater than an RSRP threshold, and the first priority is greater than the second priority. The operations of 1120 may be performed in accordance with examples as disclosed herein. In some examples, aspects of the operations of 1120 may be performed by a selection rule component 725 as described with reference to FIG. 7.

At 1125, the method may include selecting, from the first synchronization signal and the second synchronization signal based on the rule, a synchronization signal for deriving a timing at the UE. The operations of 1125 may be performed in accordance with examples as disclosed herein. In some examples, aspects of the operations of 1125 may be performed by a synchronization signal selection component 730 as described with reference to FIG. 7.

At 1130, the method may include selecting the first synchronization signal based on the determining. The operations of 1130 may be performed in accordance with examples as disclosed herein. In some examples, aspects of the operations of 1130 may be performed by a synchronization signal selection component 730 as described with reference to FIG. 7.

At 1135, the method may include forwarding the selected synchronization signal to one or more other UEs based on the selecting. The operations of 1135 may be performed in accordance with examples as disclosed herein. In some examples, aspects of the operations of 1135 may be performed by a synchronization signal forwarding component 735 as described with reference to FIG. 7.

Figure 12:
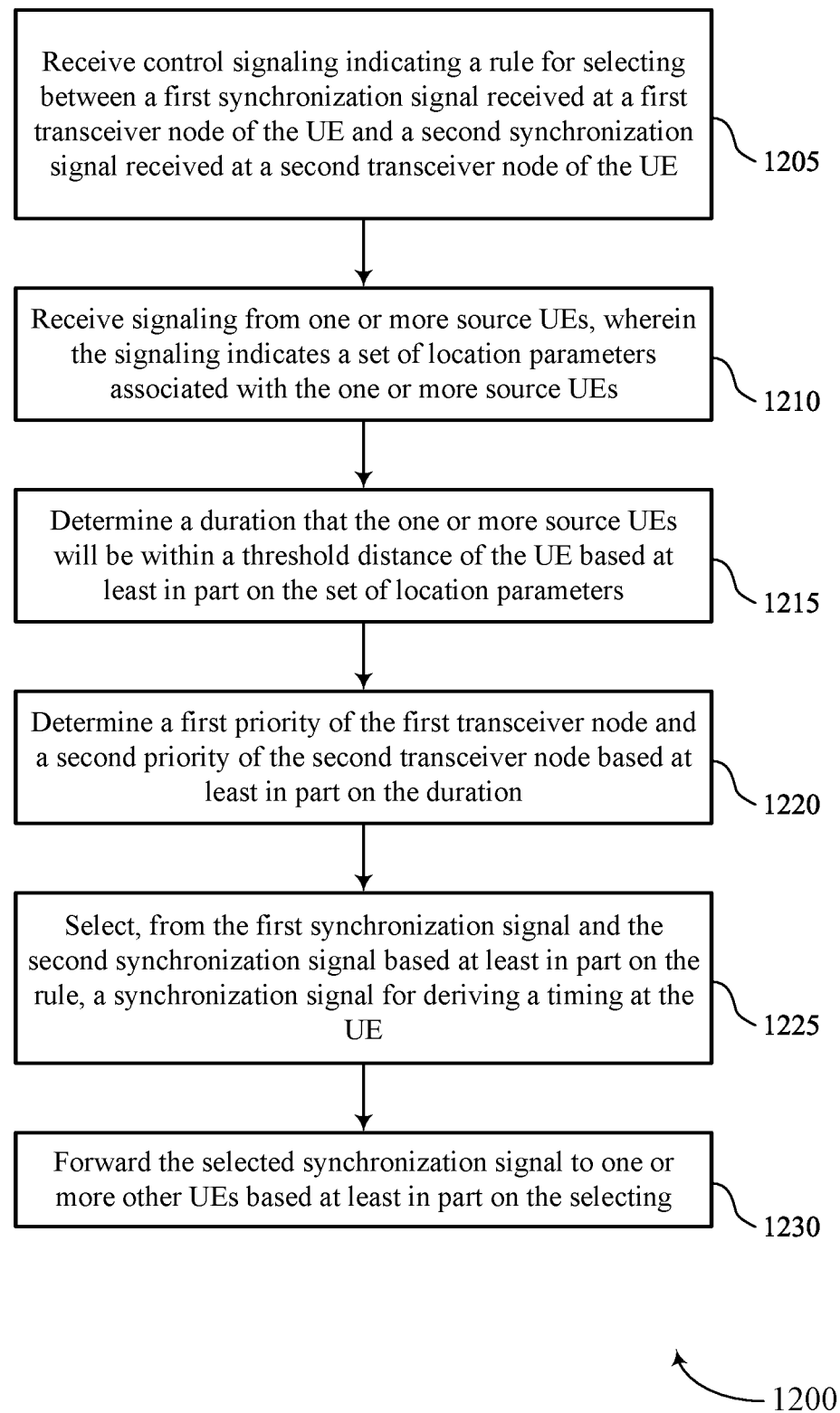

FIG. 12 shows a flowchart illustrating a method 1200 that supports synchronization signal selection across multiple transceiver nodes in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving control signaling indicating a rule for selecting between a first synchronization signal received at a first transceiver node of the UE and a second synchronization signal received at a second transceiver node of the UE. The operations of 1205 may be performed in accordance with examples as disclosed herein. In some examples, aspects of the operations of 1205 may be performed by a selection rule component 725 as described with reference to FIG. 7.

At 1210, the method may include receiving signaling from one or more source UEs, where the signaling indicates a set of location parameters associated with the one or more source UEs. The operations of 1210 may be performed in accordance with examples as disclosed herein. In some examples, aspects of the operations of 1210 may be performed by a location component 750 as described with reference to FIG. 7.

At 1215, the method may include determining a duration that the one or more source UEs will be within a threshold distance of the UE based on the set of location parameters. The operations of 1215 may be performed in accordance with examples as disclosed herein. In some examples, aspects of the operations of 1215 may be performed by a location component 750 as described with reference to FIG. 7.

At 1220, the method may include determining a first priority of the first transceiver node and a second priority of the second transceiver node based on the duration. The operations of 1220 may be performed in accordance with examples as disclosed herein. In some examples, aspects of the operations of 1220 may be performed by a priority component 745 as described with reference to FIG. 7.

At 1225, the method may include selecting, from the first synchronization signal and the second synchronization signal based on the rule, a synchronization signal for deriving a timing at the UE. The operations of 1225 may be performed in accordance with examples as disclosed herein. In some examples, aspects of the operations of 1225 may be performed by a synchronization signal selection component 730 as described with reference to FIG. 7.

At 1230, the method may include forwarding the selected synchronization signal to one or more other UEs based on the selecting. The operations of 1230 may be performed in accordance with examples as disclosed herein. In some examples, aspects of the operations of 1230 may be performed by a synchronization signal forwarding component 735 as described with reference to FIG. 7.

The following provides an overview of aspects of the present disclosure:

Aspect 1: A method for wireless communications at a UE, comprising: receiving control signaling indicating a rule for selecting between a first synchronization signal received at a first transceiver node of the UE and a second synchronization signal received at a second transceiver node of the UE; selecting, from the first synchronization signal and the second synchronization signal based at least in part on the rule, a synchronization signal for deriving a timing at the UE; and forwarding the selected synchronization signal to one or more other UEs based at least in part on the selecting.

Aspect 2: The method of aspect 1, wherein the rule indicates signal quality comparison metrics for selecting the synchronization signal from the first synchronization signal and the second synchronization signal.

Aspect 3: The method of any of aspects 1 through 2, further comprising: measuring a first RSRP value associated with the first synchronization signal and a second RSRP value associated with the second synchronization signal; determining that the first RSRP value is greater than the second RSRP value at the first transceiver node and the second RSRP value is greater than the first RSRP value at the second transceiver node, the first RSRP value and the second RSRP value are both greater than an RSRP threshold, and a difference between a maximum timing and a minimum timing of the first synchronization signal and the second synchronization signal is less than a timing threshold; and selecting the synchronization signal randomly from the first synchronization signal or the second synchronization signal based at least in part on the determining.

Aspect 4: The method of aspect 3, further comprising: receiving control signaling indicating the RSRP threshold and the timing threshold.

Aspect 5: The method of aspect 4, wherein the RSRP threshold, the timing threshold, or both, are based at least in part on a quantity of synchronization signals received at the UE, a quantity of transceiver nodes at the UE, or both.

Aspect 6: The method of any of aspects 1 through 2, further comprising: measuring a first RSRP value associated with the first synchronization signal and a second RSRP value associated with the second synchronization signal; identifying a first priority of the first transceiver node and a second priority of the second transceiver node; determining that the first RSRP value is greater than the second RSRP value at the first transceiver node and the second RSRP value is greater than the first RSRP value at the second transceiver node, the first RSRP value and the second RSRP value are greater than an RSRP threshold, and the first priority is greater than the second priority; and selecting the first synchronization signal based at least in part on the determining.

Aspect 7: The method of aspect 6, further comprising: receiving control signaling indicating the RSRP threshold.

Aspect 8: The method of aspect 7, wherein the RSRP threshold is determined based at least in part on a quantity of transceiver nodes at the UE, a quantity of synchronization signals received at the UE, or both.

Aspect 9: The method of any of aspects 1 through 8, further comprising: receiving signaling from one or more source UEs, wherein the signaling indicates a set of location parameters associated with the one or more source UEs; determining a duration that the one or more source UEs will be within a threshold distance of the UE based at least in part on the set of location parameters; and determining a first priority of the first transceiver node and a second priority of the second transceiver node based at least in part on the duration.

Aspect 10: The method of aspect 9, wherein the set of location parameters comprises a relative location, a relative motion, a destination, or a combination thereof for each source UE of the one or more source UEs.

Aspect 11: The method of any of aspects 9 through 10, wherein determining the first priority and the second priority further comprises: comparing the set of location parameters with location information associated with the UE; determining that the one or more source UEs will be within a first threshold distance of the first transceiver node for a first time period and that the one or more source UEs will be within a second threshold distance of the second transceiver node for a second time period; and determining the first priority and the second priority based at least in part on the first time period, the second time period, and a priority scale.

Aspect 12: The method of aspect 11, further comprising: receiving the signaling at an application layer of the UE; determining the first time period and the second time period at the application layer of the UE; determining the first priority and the second priority at a vehicle-to-everything layer of the UE based at least in part on the first time period, the second time period, and the priority scale; and selecting the synchronization signal at a physical layer of the UE based at least in part on the first priority and the second priority.

Aspect 13: The method of any of aspects 1 through 2, wherein the selecting further comprises: determining a highest RSRP value of a first RSRP value associated with the first synchronization signal at the first transceiver node and a second RSRP value associated with the second synchronization signal at the first transceiver node and the second transceiver node; and selecting the synchronization signal based at least in part on the synchronization signal having the highest RSRP value.

Aspect 14: The method of any of aspects 1 through 2, wherein the selecting further comprises: determining a first combined RSRP value for the first synchronization signal at the first transceiver node and the second transceiver node and a second combined RSRP value for the second synchronization signal at the first transceiver node and the second transceiver node; and selecting the synchronization signal based at least in part on the synchronization signal having a highest combined RSRP value of the first combined RSRP value and the second combined RSRP value.

Aspect 15: The method of any of aspects 1 through 2, wherein the selecting further comprises: determining a highest minimum RSRP value from a first minimum RSRP value associated with the first synchronization signal and a second minimum RSRP value associated with the second synchronization signal; and selecting the synchronization signal based at least in part on the synchronization signal having the highest minimum RSRP value.

Aspect 16: The method of any of aspects 1 through 2, wherein the selecting further comprises: determining a minimum RSRP variation between a first RSRP variation and a second RSRP variation, wherein the first RSRP variation is based at least in part on a difference between a first RSRP value associated with the first synchronization signal at the first transceiver node and a second RSRP value associated with the first synchronization signal at the second transceiver node and the second RSRP variation is based at least in part on a difference between a third RSRP value associated with the second synchronization signal at the first transceiver node and a fourth RSRP value associated with the second synchronization signal at the second transceiver node; and selecting the synchronization signal based at least in part on the synchronization signal having the minimum RSRP variation.

Aspect 17: The method of any of aspects 1 through 16, wherein the forwarding further comprises: transmitting the selected synchronization signal to the one or more other UEs using the first transceiver node and the second transceiver node.

Aspect 18: The method of any of aspects 1 through 17, wherein the first transceiver node and the second transceiver node comprise one or more transmitter and receiver components.

Aspect 19: The method of any of aspects 1 through 18, wherein the UE is a vehicle UE.

Aspect 20: An apparatus for wireless communications at a UE, comprising a processor; memory coupled with the processor; and instructions stored in the memory and executable by the processor to cause the apparatus to perform a method of any of aspects 1 through 19.

Aspect 21: An apparatus for wireless communications at a UE, comprising at least one means for performing a method of any of aspects 1 through 19.

Aspect 22: A non-transitory computer-readable medium storing code for wireless communications at a UE, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    measuring a first synchronization signal received at both a first transceiver node and a second transceiver node, wherein the first transceiver node is positioned at a first physical location on the UE and the second transceiver node is positioned at a second physical location on the UE that is different than the first physical location;
    measuring a second synchronization signal received at both the first transceiver node and the second transceiver node;
    selecting, based at least in part on a rule and from the first synchronization signal and the second synchronization signal, wherein the rule indicates selection between the first synchronization signal and the second synchronization signal when both are received at the first transceiver node positioned at the first physical location on the UE an at the second transceiver node positioned at the second physical location on the UE that is different than the first physical location; and forwarding the selected synchronization signal to one or more other UEs based at least in part on the selecting.

2. The method of claim 1, wherein the rule indicates signal quality comparison metrics for selecting the synchronization signal from the first synchronization signal and the second synchronization signal.

3. The method of claim 1, further comprising:
measuring a first reference signal received power (RSRP) value associated with the first synchronization signal and a second RSRP value associated with the second synchronization signal, wherein the first RSRP value and the second RSRP value are both measured at the first transceiver node and at the second transceiver node;

determining that the first RSRP value measured at the first transceiver node is greater than the second RSRP value measured at the first transceiver node and the second RSRP value measured at the second transceiver node is greater than the first RSRP value measured at the second transceiver node, the first RSRP value and the second RSRP value are both greater than an RSRP threshold, and a difference between a maximum timing and a minimum timing of the first synchronization signal and the second synchronization signal is less than a timing threshold; and selecting the synchronization signal randomly from the first synchronization signal or the second synchronization signal based at least in part on the determining.

4. The method of claim 3, further comprising:
receiving, via control signaling or second control signaling, an indication of the RSRP threshold and the timing threshold.

5. The method of claim 4, wherein the RSRP threshold, the timing threshold, or both, are based at least in part on a quantity of synchronization signals received at the UE, a quantity of transceiver nodes at the UE, or both.

6. The method of claim 1, further comprising:
measuring a first reference signal received power (RSRP) value associated with the first synchronization signal and a second RSRP value associated with the second synchronization signal, wherein the first RSRP value and the second RSRP value are both measured at the first transceiver node and at the second transceiver node;

identifying a first priority of the first transceiver node and a second priority of the second transceiver node;

determining that the first RSRP value measured at the first transceiver node is greater than the second RSRP value measured at the first transceiver node and the second RSRP value measured at the second transceiver node is greater than the first RSRP value measured at the second transceiver node, the first RSRP value and the second RSRP value are greater than an RSRP threshold, and the first priority is greater than the second priority; and selecting the first synchronization signal based at least in part on the determining.

7. The method of claim 6, further comprising:
receiving, via control signaling or second control signaling, an indication of the RSRP threshold.

8. The method of claim 7, wherein the RSRP threshold is determined based at least in part on a quantity of transceiver nodes at the UE, a quantity of synchronization signals received at the UE, or both.

9. The method of claim 1, further comprising:
receiving signaling from one or more source UEs, wherein the signaling indicates a set of location parameters associated with the one or more source UEs;

determining a duration that the one or more source UEs will be within a threshold distance of the UE based at least in part on the set of location parameters; and determining a first priority of the first transceiver node and a second priority of the second transceiver node based at least in part on the duration.

10. The method of claim 9, wherein the set of location parameters comprises a relative location, a relative motion, a destination, or a combination thereof for each source UE of the one or more source UEs.

11. The method of claim 9, wherein determining the first priority and the second priority further comprises:
comparing the set of location parameters with location information associated with the UE;

determining that the one or more source UEs will be within a first threshold distance of the first transceiver node for a first time period and that the one or more source UEs will be within a second threshold distance of the second transceiver node for a second time period; and determining the first priority and the second priority based at least in part on the first time period, the second time period, and a priority scale.

12. The method of claim 11, further comprising:
receiving the signaling at an application layer of the UE;
determining the first time period and the second time period at the application layer of the UE;
determining the first priority and the second priority at a vehicle-to-everything layer of the UE based at least in part on the first time period, the second time period, and the priority scale; and
selecting the synchronization signal at a physical layer of the UE based at least in part on the first priority and the second priority.

13. The method of claim 1, wherein the selecting further comprises:
determining a highest reference signal received power (RSRP) value of a first RSRP value associated with the first synchronization signal at both the first transceiver node and the second transceiver node and a second RSRP value associated with the second synchronization signal at both the first transceiver node and the second transceiver node; and
selecting the synchronization signal based at least in part on the synchronization signal having the highest RSRP value.

14. The method of claim 1, wherein the selecting further comprises:
determining a first combined reference signal received power (RSRP) value for the first synchronization signal at both the first transceiver node and the second transceiver node and a second combined RSRP value for the second synchronization signal at both the first transceiver node and the second transceiver node; and
selecting the synchronization signal based at least in part on the synchronization signal having a highest combined RSRP value of the first combined RSRP value and the second combined RSRP value.

15. The method of claim 1, wherein the selecting further comprises:
    determining a highest minimum reference signal received power (RSRP) value from a first minimum RSRP value associated with the first synchronization signal and a second minimum RSRP value associated with the second synchronization signal; and
    selecting the synchronization signal based at least in part on the synchronization signal having the highest minimum RSRP value.

16. The method of claim 1, wherein the selecting further comprises:
    determining a minimum reference signal received power (RSRP) variation between a first RSRP variation and a second RSRP variation, wherein the first RSRP variation is based at least in part on a difference between a first RSRP value associated with the first synchronization signal at the first transceiver node and a second RSRP value associated with the first synchronization signal at the second transceiver node and the second RSRP variation is based at least in part on a difference between a third RSRP value associated with the second synchronization signal at the first transceiver node and a fourth RSRP value associated with the second synchronization signal at the second transceiver node; and
    selecting the synchronization signal based at least in part on the synchronization signal having the minimum RSRP variation.

17. The method of claim 1, wherein the forwarding further comprises:
    transmitting the selected synchronization signal to the one or more other UEs using the first transceiver node and the second transceiver node.

18. The method of claim 1, wherein the first transceiver node and the second transceiver node comprise one or more transmitter and receiver components.

19. The method of claim 1, wherein the UE is a vehicle UE.

20. An apparatus for wireless communications at a user equipment (UE), comprising:
    a processor;
    memory coupled with the processor; and
    instructions stored in the memory and executable by the processor to cause the apparatus to:
        measure a first synchronization signal received at both a first transceiver node and a second transceiver node, wherein the first transceiver node is positioned at a first physical location on the UE and the second transceiver node is positioned at a second physical location on the UE that is different than the first physical location;
        measure a second synchronization signal received at both the first transceiver node and the second transceiver node;
        select, based at least in part on a rule and from the first synchronization signal and the second synchronization, a synchronization signal for deriving a timing at the UE, wherein the rule selection between the first synchronization signal and the second synchronization signal when both are received at the first transceiver node positioned at the first physical location on the UE and at the second transceiver node positioned at the second physical location on the UE that is different than the first physical location; and
        forward the selected synchronization signal to one or more other UEs based at least in part on the selecting.

21. The apparatus of claim 20, wherein the rule indicates signal quality comparison metrics for selecting the synchronization signal from the first synchronization signal and the second synchronization signal.

22. The apparatus of claim 20, wherein the instructions are further executable by the processor to cause the apparatus to:
    measure a first reference signal received power (RSRP) value associated with the first synchronization signal and a second RSRP value associated with the second synchronization signal, wherein the first RSRP value and the second RSRP value are both measured at the first transceiver node and at the second transceiver node;
    determine that the first RSRP value measured at the first transceiver node is greater than the second RSRP value measured at the first transceiver node and the second RSRP value measured at the second transceiver node is greater than the first RSRP value measured at the second transceiver node, the first RSRP value and the second RSRP value are both greater than an RSRP threshold, and a difference between a maximum timing and a minimum timing of the first synchronization signal and the second synchronization signal is less than a timing threshold; and
    select the synchronization signal randomly from the first synchronization signal or the second synchronization signal based at least in part on the determining.

23. The apparatus of claim 22, wherein the instructions are further executable by the processor to cause the apparatus to:
    receive, via control signaling or second control signaling, an indication of the RSRP threshold and the timing threshold.

24. The apparatus of claim 23, wherein the RSRP threshold, the timing threshold, or both, are based at least in part on a quantity of synchronization signals received at the UE, a quantity of transceiver nodes at the UE, or both.

25. The apparatus of claim 20, wherein the instructions are further executable by the processor to cause the apparatus to:
    measure a first reference signal received power (RSRP) value associated with the first synchronization signal and a second RSRP value associated with the second synchronization signal, wherein the first RSRP value and the second RSRP value are both measured at the first transceiver node and at the second transceiver node;
    identify a first priority of the first transceiver node and a second priority of the second transceiver node;
    determine that the first RSRP value measured at the first transceiver node is greater than the second RSRP value measured at the first transceiver node and the second RSRP value measured at the second transceiver node is greater than the first RSRP value measured at the second transceiver node, the first RSRP value and the second RSRP value are greater than an RSRP threshold, and the first priority is greater than the second priority; and
    select the first synchronization signal based at least in part on the determining.

26. The apparatus of claim 25, wherein the instructions are further executable by the processor to cause the apparatus to:
    receive, via control signaling or second control signaling, an indication of the RSRP threshold.

27. The apparatus of claim 26, wherein the RSRP threshold is determined based at least in part on a quantity of transceiver nodes at the UE, a quantity of synchronization signals received at the UE, or both.

28. The apparatus of claim 20, wherein the instructions are further executable by the processor to cause the apparatus to:
   receive signaling from one or more source UEs, wherein the signaling indicates a set of location parameters associated with the one or more source UEs;
   determine a duration that the one or more source UEs will be within a threshold distance of the UE based at least in part on the set of location parameters; and
   determine a first priority of the first transceiver node and a second priority of the second transceiver node based at least in part on the duration.

29. The apparatus of claim 28, wherein the set of location parameters comprises a relative location, a relative motion, a destination, or a combination thereof for each source UE of the one or more source UEs.

30. The apparatus of claim 28, wherein the instructions to determine the first priority and the second priority are further executable by the processor to cause the apparatus to:
   compare the set of location parameters with location information associated with the UE;
   determine that the one or more source UEs will be within a first threshold distance of the first transceiver node for a first time period and that the one or more source UEs will be within a second threshold distance of the second transceiver node for a second time period; and
   determine the first priority and the second priority based at least in part on the first time period, the second time period, and a priority scale.

\* \* \* \* \*